United States Patent
Choi et al.

(10) Patent No.: US 10,142,083 B2
(45) Date of Patent: Nov. 27, 2018

(54) METHOD AND APPARATUS FOR TRANSMITTING CONTROL CHANNEL DEPENDING ON UE CAPABILITY IN INTRA-CELL CARRIER AGGREGATION SYSTEM

(71) Applicant: Samsung Electronics Co., Ltd., Suwon-si, Gyeonggi-do (KR)

(72) Inventors: Seunghoon Choi, Suwon-si (KR); Hyoungju Ji, Seoul (KR); Youngbum Kim, Seoul (KR); Joonyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/190,418

(22) Filed: Feb. 26, 2014

(65) Prior Publication Data

US 2014/0241220 A1    Aug. 28, 2014

(30) Foreign Application Priority Data

Feb. 26, 2013    (KR) .................. 10-2013-0020455

(51) Int. Cl.
   *H04L 5/14*    (2006.01)
   *H04L 5/00*    (2006.01)
   (Continued)

(52) U.S. Cl.
   CPC .................. *H04L 5/14* (2013.01); *H04L 1/00* (2013.01); *H04L 5/001* (2013.01); *H04L 5/0044* (2013.01);
   (Continued)

(58) Field of Classification Search
   None
   See application file for complete search history.

(56) References Cited

U.S. PATENT DOCUMENTS

2009/0303941 A1* 12/2009 Naka et al. .................. 370/329
2010/0254328 A1 10/2010 McBeath et al.
(Continued)

FOREIGN PATENT DOCUMENTS

| CN | 101686534 A | 3/2010 |
|----|-------------|--------|
| CN | 101877911 A | 11/2010 |

(Continued)

OTHER PUBLICATIONS

Li et al., "Control Channel Design for Carrier Aggregation Between LTE FDD and LTE TDD Systems," 2012 IEEE 75th Vehicular Technology Conference, May 6-9, 2012, pp. 1-5, X9032202278, Piscataway NJ.

(Continued)

*Primary Examiner* — Saba Tsegaye
(74) *Attorney, Agent, or Firm* — Jefferson IP Law, LLP

(57) ABSTRACT

A method and an apparatus for transmitting a control channel when cells have different duplex structures in an intra-cell carrier aggregation system are provided. The method of transmitting and/or receiving a control channel by an evolved Node B (eNB) in a wireless communication system includes receiving capability information of a User Equipment (UE) from the UE, transmitting scheduling information to the UE, transmitting downlink data according to the transmitted scheduling information, and receiving an uplink control channel for the downlink data from the UE based on the capability information of the UE.

12 Claims, 14 Drawing Sheets

(51) Int. Cl.
*H04W 72/04* (2009.01)
*H04L 1/00* (2006.01)

(52) U.S. Cl.
CPC .......... *H04L 5/0055* (2013.01); *H04L 5/1469* (2013.01); *H04W 72/048* (2013.01); *H04L 5/0053* (2013.01); *H04W 72/0453* (2013.01)

(56) References Cited

U.S. PATENT DOCUMENTS

| | | | |
|---|---|---|---|
| 2011/0170508 A1* | 7/2011 | Xue et al. | 370/329 |
| 2011/0319069 A1 | 12/2011 | Li | |
| 2012/0063358 A1 | 3/2012 | Etemad | |
| 2012/0113914 A1 | 5/2012 | Zhao et al. | |
| 2012/0218954 A1 | 8/2012 | Barbieri et al. | |
| 2012/0257551 A1* | 10/2012 | Diao | H04W 72/048 370/280 |
| 2012/0327821 A1 | 12/2012 | Lin et al. | |
| 2013/0028149 A1 | 1/2013 | Chen et al. | |
| 2013/0028205 A1 | 1/2013 | Damnjanovic et al. | |
| 2013/0034073 A1 | 2/2013 | Aiba et al. | |
| 2013/0170406 A1 | 7/2013 | Kishiyama | |
| 2013/0195058 A1* | 8/2013 | Ode | 370/329 |
| 2014/0016593 A1* | 1/2014 | Park | H04L 5/001 370/329 |
| 2014/0086078 A1* | 3/2014 | Malladi | H04W 72/042 370/252 |
| 2014/0133415 A1* | 5/2014 | Damnjanovic | H04W 52/146 370/329 |
| 2014/0140318 A1* | 5/2014 | Uemura et al. | 370/330 |
| 2015/0078221 A1* | 3/2015 | Seo et al. | 370/280 |
| 2015/0156649 A1* | 6/2015 | Elmdahl | H04B 7/0413 370/241.1 |

FOREIGN PATENT DOCUMENTS

| | | |
|---|---|---|
| CN | 102223215 A | 10/2011 |
| WO | 2012029873 A1 | 3/2012 |
| WO | 2012175030 A1 | 12/2012 |

OTHER PUBLICATIONS

3GPP LTE, 3rd Generation Partnership Project; Technical Specification Group Radio Access Network; Evolved Universal Terrestrial Radio Access (E-UTRA); Physical Layer Procedures (Release11), 3GPP TS 36.213 V11.1.0, Dec. 1, 2012, pp. 1-160, XP055274196.
Chinese Office Action dated Jan. 2, 2018, issued in Chinese Patent Application No. 201480010675.2.
Japanese Office Action dated Feb. 19, 2018, issued in Japanese Patent Application No. 2015-559198.

* cited by examiner

METHOD AND APPARATUS FOR TRANSMITTING CONTROL CHANNEL DEPENDING ON UE CAPABILITY IN INTRA-CELL CARRIER AGGREGATION SYSTEM

CROSS-REFERENCE TO RELATED APPLICATION(S)

This application claims the benefit under 35 U.S.C. § 119(a) of a Korean patent application filed on Feb. 26, 2013 in the Korean Intellectual Property Office and assigned Serial number 10-2013-0020455, the entire disclosure of which is hereby incorporated by reference.

TECHNICAL FIELD

The present disclosure relates to a method and an apparatus for transmitting a control channel according to a capability of a User Equipment (UE) in an intra-cell carrier aggregation system. More particularly, the present disclosure relates to a method and an apparatus for transmitting a control channel according to a capability of a UE supporting an uplink carrier when cells have different duplex schemes.

BACKGROUND

In general, a mobile communication system is developed to provide voice communication service while guaranteeing activity of users. However, the mobile communication systems may include a data providing service beyond the voice communication service and may provide a high speed data service. In spite of such a development, current mobile communication systems are undergoing a deficiency of resources and should further improve their performance due to the needs of users for a service of a higher speed.

Long Term Evolution-Advanced (LTE-A) in the 3rd Generation Partnership Project (3GPP) is a technology implementing a high speed packet-based communication having a transmission speed including 1 Gbps. Further, in LTE-A, all the cells accessible by a UE have the same duplex structure. Therefore, all the cells may have a Frequency Division Duplex (FDD) structure or may have a Time Division Duplex (TDD) structure. The TDD structure may be a static TDD structure, in which an Uplink-Downlink (UL-DL) configuration is maintained, or a dynamic TDD structure, in which the UL-DL configuration is changed by system information, a higher layer signal, or a downlink common control channel.

If one cell controlled by an evolved Node B (eNB) has an FDD structure and a single frequency band is added to the FDD structure, it is easy to apply a TDD structure to the added single frequency band because two different frequency bands are needed for the downlink and the uplink, respectively, in order to operate the FDD structure. Therefore, there is a need for a scheme for transmitting a control channel for data transmitted from a plurality of cells when the cells have different duplex schemes due to the addition of limited frequency bands as described above or other reasons.

The LTE-A employs a scheme which increases the number of cells accessible by a UE while allowing feedback occurring in respective cells to be transmitted in only a Primary cell, which may be referred to as a P cell or Pcell. Specifically, a UE capable of supporting only one carrier in the uplink transmits an uplink control channel by using only one uplink carrier. Therefore, even when a UE capable of supporting a plurality of carriers in the uplink and a UE capable of supporting only one carrier in the uplink coexist, the LTE-A, which does not include many UEs capable of supporting a plurality of carriers within an eNB, has employed a method allowing feedback occurring in the downlink of each cell to be transmitted in only a primary cell, in order to define a standard for supporting all UEs.

However, when the number of UEs supporting a plurality of uplink carriers increases, transmission of an uplink control channel through a plurality of uplink carriers should be supported. Further, there is a need for a technology in which an eNB schedules uplink data to a UE and transmits a downlink control channel for the uplink data to the UE, according to a capability of a UE supporting an uplink carrier.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting a control channel when cells have different duplex structures in an intra-cell carrier aggregation system.

In accordance with an aspect of the present disclosure, a method of transmitting and/or receiving a control channel by an evolved Node B (eNB) in a wireless communication system is provided. The method includes receiving capability information of a User Equipment (UE) from the UE, transmitting scheduling information to the UE, transmitting downlink data according to the transmitted scheduling information, and receiving an uplink control channel for the downlink data from the UE based on the capability information of the UE.

In accordance with another aspect of the present disclosure, a method of transmitting and/or receiving a control channel by a UE in a wireless communication system is provided. The method includes transmitting capability information of the UE to an eNB, receiving scheduling information of the eNB and downlink data according to the scheduling information from the eNB, and transmitting an uplink control channel for the downlink data to the eNB according to the capability information of the UE.

In accordance with another aspect of the present disclosure, an eNB for transmitting and/or receiving a control channel in a wireless communication system is provided. The eNB includes a transceiver unit configured to transmit a downlink control channel to a UE and to receive an uplink control channel from the UE, and a controller configured to control the transceiver unit to receive capability information of a User Equipment (UE) from the UE, to transmit scheduling information to the UE, transmit downlink data according to the transmitted scheduling information, and to receive an uplink control channel for the downlink data from the UE the capability information of the UE.

In accordance with another aspect of the present disclosure, a UE for transmitting and/or receiving a control channel in a wireless communication system is provided. The UE includes a transceiver unit configured to receive a downlink control channel from an eNB and to transmit an uplink control channel to the eNB, and a controller configured to control the transceiver unit to transmit capability information of the UE to the eNB, to receive scheduling information of the eNB and downlink data according to the scheduling information from the eNB, and to transmit an uplink control channel for the downlink data to the eNB according to the capability information of the UE.

According to an embodiment of the present disclosure, a UE and an eNB may transmit and receive a control channel needed for data scheduling.

Further, according to an embodiment of the present disclosure, simultaneous data transmission and reception through cells having different duplex schemes may be enabled according to a capability of a UE supporting an uplink carrier, so as to raise a maximum transmission rate.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
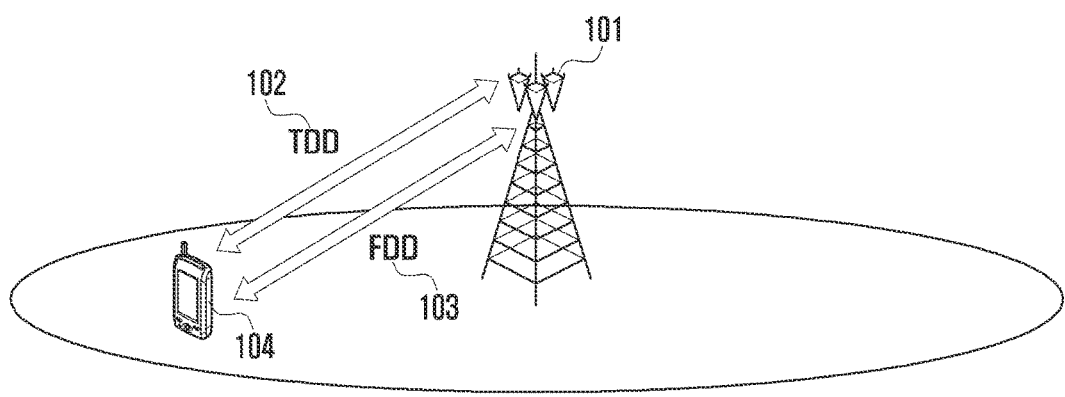
FIGS. 1A and 1B illustrate communication systems according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although an embodiment of the present disclosure is described according to a Long Term Evolution (LTE) system and an LTE-Advanced (LTE-A) system as an example in the present specification, the present disclosure may be applied to any other similar and/or suitable communication system without making any adjustment to other communication systems employing base station scheduling.

An Orthogonal Frequency Division Multiplexing (OFDM) transmission scheme is a data transmission scheme using a multi-carrier, and a type of a Multi-Carrier Modulation (MCM) scheme, in which serially input symbol strings are converted in parallel, and respective converted symbol strings are modulated with a plurality of mutually orthogonal sub-carriers, that is, a plurality of mutually orthogonal sub-channels, and are then transmitted.

In the OFDM scheme, a modulation signal is located at a second-dimensional resource configured according to a time and a frequency. Resources on a time axis are distinguished from each other by different OFDM symbols, which are orthogonal to each other. Resources on a frequency axis are distinguished from each other by different sub-carriers, which are also orthogonal to each other. That is, in the OFDM scheme, by appointing a particular OFDM symbol on the time axis and appointing a particular sub-carrier on the frequency axis, it is possible to indicate one minimum unit resource, which is referred to as a Resource Element (RE). Different REs are orthogonal, even after passing a frequency selective channel. Therefore, signals transmitted through different REs may be received by a receiver without causing interference with each other.

A physical channel is a channel of a physical layer for transmitting a modulation symbol obtained by modulating one or more encoded bit strings. In an Orthogonal Frequency Division Multiple Access (OFDMA) system, an information string is transmitted by configuring a plurality of physical channels according to a use of the information string and/or received by a receiver for receiving the information string. A term "mapping" may refer to a rule, which may be allocated in advance between a transmitter and a receiver, regarding which RE one physical channel should be located on for transmission.

In an OFDM communication system, a downlink bandwidth is configured by a plurality of Physical Resource Blocks (PRBs) and each PRB may be configured by 12 sub-carriers arranged along the frequency axis and 14 or 12 OFDM symbols arranged along the time axis. The PRB serves as a basic unit for resource allocation.

A Reference Signal (RS) is a signal originated from an evolved Node B (eNB). A User Equipment (UE) performs channel estimation by using the RS. In an LTE communication system, the RS includes a Common Reference Signal (CRS) and a DeModulation Reference Signal (DMRS). The DMRS may be a dedicated reference signal.

The CRS is a reference signal transmitted over the entire downlink bandwidth. All UEs may receive the CRS. The CRS is used for channel estimation, configuration of feedback information of a UE, and/or demodulation of a control channel and/or a data channel. The DMRS is also a reference signal transmitted over the entire downlink bands. The DMRS is used for channel estimation and demodulation of a data channel of a particular UE and is not used for configuration of feedback information differently from the CRS. Therefore, the DMRS is transmitted through a PRB to be scheduled by a UE.

On the time axis, a sub-frame is configured by two slots, each having a length of 0.5 msec, which include a first slot and a second slot. A Physical Downlink Control Channel (PDCCH) area, which is a control channel area, and an enhanced PDCCH (ePDCCH) area, which is a data channel area, are divided on the time axis and are then transmitted, in order to rapidly receive and demodulate a control channel signal. Moreover, the PDCCH area is located over the entire downlink bandwidth, wherein one control channel is divided into control channels of a smaller unit, which are distributed over the entire downlink bandwidth.

Uplink channels may be divided into a control channel, such as a Physical Uplink Control CHannel (PUCCH), and a data channel, such as a Physical Uplink Shared CHannel (PUSCH). When an uplink data channel is not scheduled, a response channel, with respect to a downlink data channel, and other feedback information are transferred through the control channel. When an uplink data channel has been scheduled, a response channel, with respect to a downlink data channel, and other feedback information are transferred through the data channel.

Figure 1B:
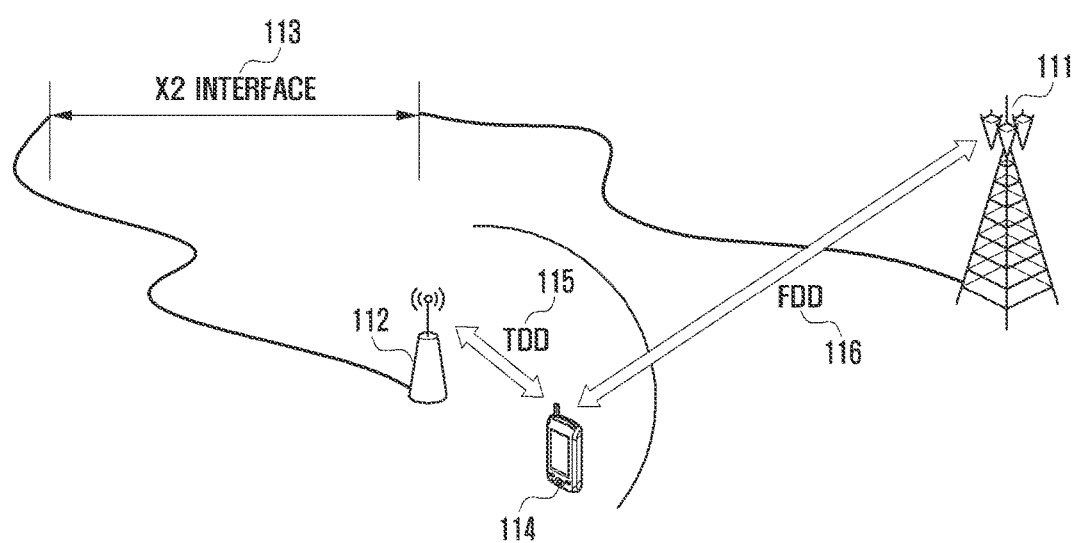

FIGS. 1A and 1B illustrate wireless communication systems according to an embodiment of the present disclosure.

Referring to FIG. 1A, a wireless communication system may have a structure in which a TDD cell 102 and an FDD cell 103 coexist in one eNB 101 in a network. A UE 104 transmits data to the eNB and receives data from the eNB through the TDD cell 102 and the FDD cell 103.

In a wireless communication system, according to an embodiment of the present disclosure, the UE 104 may transmit an uplink control channel through a plurality of uplink carriers or through one uplink carrier according to a capability of the UE 104. When the UE 104 has a capability of transmitting an uplink control channel through a plurality of uplink carriers, the UE performs uplink transmission through both the TDD cell 102 and the FDD cell 103. When the UE 104 has a capability of transmitting an uplink control channel through one uplink carrier, the UE performs uplink transmission through only a Primary cell (Pcell), from among the TDD cell 102 and the FDD cell 103. For example, when the TDD cell 102 is a Pcell, the UE 104 performs uplink transmission through only the TDD cell 102. Otherwise, when the FDD cell 103 is the Pcell, the UE 104 performs uplink transmission through only the FDD cell 103.

Referring to FIG. 1B, a wireless communication system has a structure in which a macro eNB 111, which is used for a wide coverage, and a pico eNB 112, which is used for increasing the data transmission, coexist in a network. In the wireless communication system shown in FIG. 1B, the macro eNB 111 uses an FDD scheme 116 and the pico eNB 112 uses a TDD scheme 115 for communication with the UE 114. However, the opposite case is also possible.

In a wireless communication system, according to an embodiment of the present disclosure, the UE 114 may transmit an uplink control channel through a plurality of uplink carriers or through one uplink carrier according to a capability of the UE 114. When the UE 114 has a capability of transmitting an uplink control channel through a plurality of uplink carriers, the UE 114 performs uplink transmission through both the pico eNB 112 employing the TDD scheme and the macro eNB 111 employing the FDD scheme. When the UE 114 has a capability of transmitting an uplink control channel through one uplink carrier, the UE 114 performs uplink transmission through only a Pcell. For example, when the macro eNB 111 corresponds to a Pcell, the UE 114 performs uplink transmission through only the macro eNB 111. In this event, it is assumed that the macro eNB 111 and the pico eNB 112 have an ideal backhaul network. Therefore, an X2 interface 113 between eNBs with high speed communication may be achieved. As a result, even when an uplink signal of the UE 114 is transmitted to only the macro eNB 111, the pico eNB 112 may receive control information relating to the UE 114 from the macro eNB 111 in real time through the X2 interface 113.

In a wireless communication system of FIG. 1A or 1B, a transmission time point of an HARQ transmitted in the uplink may be determined according to a capability of a UE supporting an uplink carrier.

In an embodiment of the present disclosure, a wireless communication system applies Hybrid Automatic Repeat Request (HARQ) timing according to whether a UE has a capability of transmitting an uplink control channel through only one uplink carrier or a capability of transmitting an uplink control channel through a plurality of uplink carriers. Therefore, in the present disclosure, different HARQ timings are applied according to the capability of a UE, i.e. according to the number of uplink carriers for transmission of an uplink control channel. As a result, the present disclosure effectively increases a quantity of data transmission in accordance with the capability of the UE.

In an embodiment of the present disclosure, the wireless communication system applies different HARQ timings according to a signaling on the number of uplink carriers for transmission of an uplink control channel. Also, according to the present disclosure, when a UE has a capability of transmitting an uplink control channel through a plurality of uplink carriers, the number of uplink carriers for transmission of an uplink control channel is adjusted and a HARQ timing is accordingly changed and applied according to whether the UE is located at a center of a cell or at a boundary of a cell, or according to whether the UE has a good channel state or a bad channel state. As a result, an embodiment of the present disclosure may adjust the quantity of data transmission in accordance with the communication environment of the UE.

Although the schemes proposed in an embodiment of the present disclosure may be applied to both the wireless communication system shown in FIG. 1A and the wireless communication system shown in FIG. 1B, the following description is mainly based on the wireless communication system shown in FIG. 1A.

Hereinafter, various embodiments will be described in relation to uplink control channel transmission time points that are applied differently according to a capability of a UE supporting an uplink carrier.

First, HARQ timing, as described in the present disclosure, when a UE has a capability of transmitting an uplink control channel through a plurality of uplink carriers and transmits the uplink control channel through the plurality of uplink carriers, will be described.

When a UE transmits an uplink control channel through a plurality of uplink carriers, a HARQ-Acknowledgement (HARQ-ACK) for Physical Downlink Shared Channels (PDSCHs) scheduled in a downlink sub-frame of each cell is transmitted according to HARQ timing defined in each cell.

The HARQ timing described in the present disclosure, when a UE has a capability of transmitting an uplink control channel through a plurality of uplink carriers and transmits the uplink control channel through the plurality of uplink carriers, will be described in more detail with reference to FIGS. 2A and 2B.

Figure 2A:
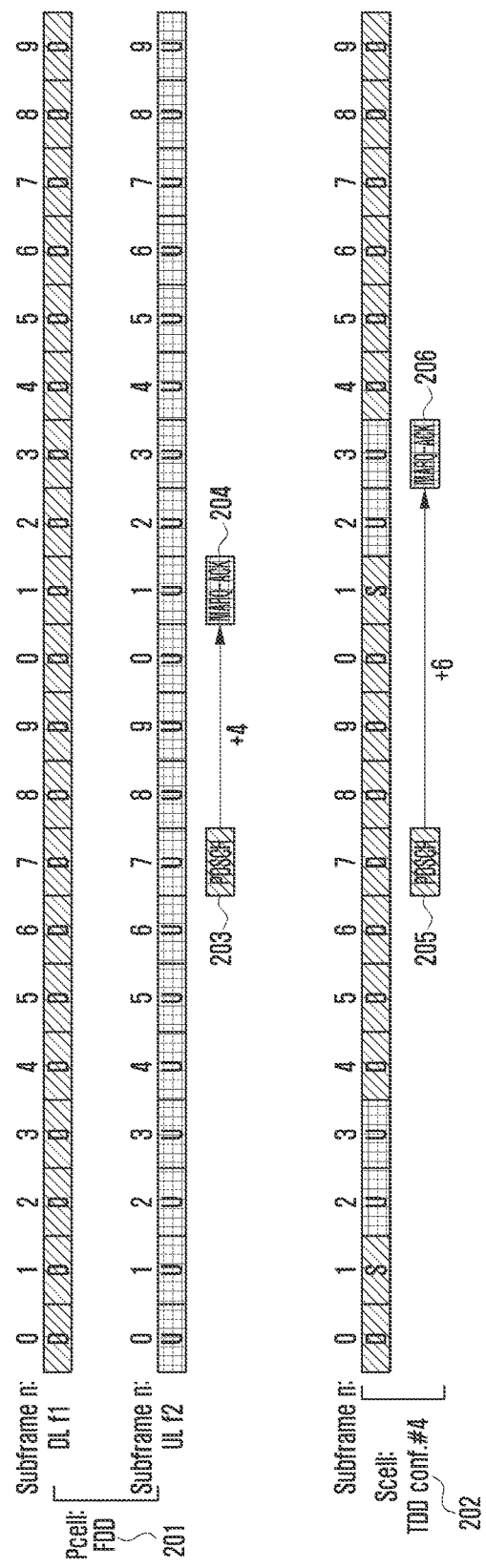
FIG. 2A illustrates an uplink control channel transmission time point according to an embodiment of the present disclosure.
Figure 2B:
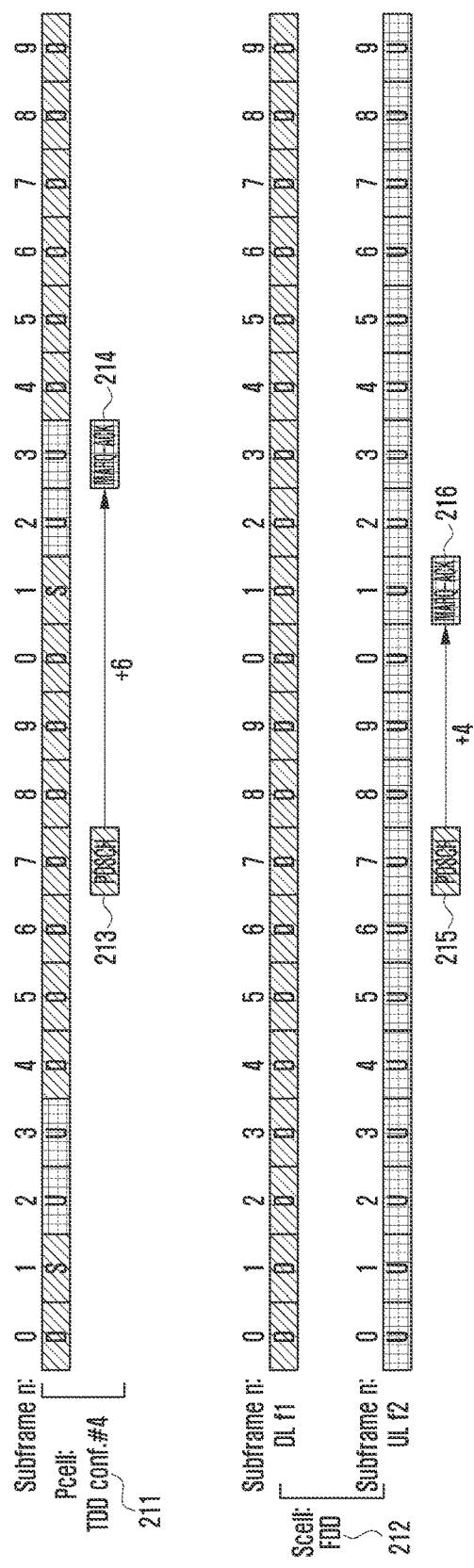
FIG. 2B illustrates an uplink control channel transmission time point according to an embodiment of the present disclosure.

FIG. 2A illustrates an uplink control channel transmission time point according to an embodiment of the present disclosure and FIG. 2B illustrates an uplink control channel transmission time point according to an embodiment of the present disclosure.

Referring to FIG. 2A, a HARQ timing method of the present disclosure for PDSCHs scheduled in downlink sub-frames of an FDD cell, which is a Pcell, and PDSCHs scheduled in downlink sub-frames of a TDD cell, which is a Secondary cell, which may be referred to as a Scell or S cell, will be described.

The embodiment of FIG. 2A is based on an assumption that a UE has a capability of transmitting an uplink control channel through a plurality of uplink carriers and transmits the uplink control channel through the plurality of uplink carriers. Further, the embodiment of FIG. 2A is based on an assumption that a Pcell uses an FDD scheme and an Scell uses a TDD scheme.

As shown in FIG. 2A, a wireless communication system has a structure in which a Pcell 201 and an Scell 202, which respectively use different duplex schemes, coexist. In FIG. 2A, the Pcell 201, which may be referred to as a FDD cell 201, uses the FDD scheme, frequency $f_1$ is used for the downlink transmission, and frequency $f_2$ is used for the uplink transmission. The Scell 202, which may be referred to as a TDD cell 202, uses the TDD scheme and includes downlink sub-frames and uplink sub-frames configured according to TDD Uplink-Downlink (UL-DL) configuration #4.

In the embodiment shown in FIG. 2A, the UE has a capability of transmitting an uplink control channel through a plurality of uplink carriers and transmits the uplink control channel through the plurality of uplink carriers. When a UE transmits an uplink control channel through a plurality of uplink carriers, an uplink control channel, which is for downlink data transmitted in a downlink sub-frame of each cell, is individually transmitted in each cell and is transmitted in a sub-frame corresponding to a transmission time point defined in each cell.

Specifically, when a PDSCH 203 is scheduled in the Pcell 201, i.e. the FDD cell 201, a HARQ-ACK 204 for the PDSCH 203 is transmitted in an uplink sub-frame of the FDD cell 201 according to the HARQ timing defined in the FDD cell 201. For example, when the PDSCH is transmitted in downlink sub-frame #7 of the FDD cell 201, the HARQ-ACK 204 for the PDSCH 203 is transmitted in next uplink sub-frame #1 of the FDD cell 201 according to the HARQ timing defined in the FDD cell 201.

Similarly, when a PDSCH 205 is scheduled to the UE in the Scell 202, i.e. the TDD cell 202, a HARQ-ACK 206 for the PDSCH 205 is transmitted in an uplink sub-frame of the TDD cell 202 according to HARQ timing defined in TDD UL-DL configuration #4. For example, when the PDSCH 205 is transmitted in downlink sub-frame #7 of the TDD cell 202, the HARQ-ACK 206 for the PDSCH 205 is transmitted in next uplink sub-frame #3 of the TDD cell 202 according to the HARQ timing defined in TDD UL-DL configuration #4.

That is, when a UE has a capability of transmitting an uplink control channel through a plurality of uplink carriers and transmits the uplink control channel through the plurality of uplink carriers, a HARQ-ACK for a PDSCH scheduled in each cell is transmitted in an uplink sub-frame of each cell according to HARQ timing defined in the cell in which the PDSCH is scheduled. Next, with reference to FIG. 2B, an HARQ timing method proposed by the present disclosure for PDSCHs scheduled in downlink sub-frames of a TDD cell, which is a Pcell, and PDSCHs scheduled in downlink sub-frames of an FDD cell, which is an Scell, will be described.

The embodiment of FIG. 2B is based on an assumption that a UE has a capability of transmitting an uplink control channel through a plurality of uplink carriers and transmits the uplink control channel through the plurality of uplink carriers. Further, the second embodiment is based on assumption that the Pcell uses the TDD scheme and the Scell uses the FDD scheme.

As shown in FIG. 2B, a wireless communication system has a structure in which a Pcell 211 and an Scell 212, respectively using different duplex schemes, coexist. In FIG. 2B, the Pcell 211, which may be referred to as a TDD cell 211, uses the TDD scheme and includes downlink sub-frames and uplink sub-frames configured according to TDD UL-DL configuration #4. The Scell 212, which may be referred to as an FDD cell 212, uses the FDD scheme, frequency $f_1$ is used for the downlink transmission, and frequency $f_2$ is used for the uplink transmission.

In the embodiment shown in FIG. 2B, the UE has a capability of transmitting an uplink control channel through a plurality of uplink carriers and transmits the uplink control channel through the plurality of uplink carriers. When a UE transmits an uplink control channel through a plurality of uplink carriers, an uplink control channel for downlink data transmitted in a downlink sub-frame of each cell is individually transmitted in each cell and is transmitted in a sub-frame corresponding to a transmission time point defined in each cell.

Specifically, when a PDSCH 213 is scheduled to the UE in the Pcell 211, i.e. the TDD cell 211, a HARQ-ACK 214 for the PDSCH 213 is transmitted in an uplink sub-frame of the TDD cell according to HARQ timing defined in the TDD cell 211. For example, when the PDSCH 213 is transmitted in downlink sub-frame #7 of the TDD cell 211, the HARQ-ACK 214 for the PDSCH 213 is transmitted in next uplink sub-frame #3 of the TDD cell 211 according to the HARQ timing defined in TDD UL-DL configuration #4.

Similarly, when a PDSCH 215 is scheduled to the UE in the Scell 212, i.e. the FDD cell 212, a HARQ-ACK 216 for the PDSCH 215 is transmitted in an uplink sub-frame of the FDD cell 212 according to HARQ timing defined in the FDD cell 212. For example, when the PDSCH 215 is transmitted in downlink sub-frame #7 of the FDD cell 212, the HARQ-ACK 216 for the PDSCH 215 is transmitted in next uplink sub-frame #1 of the TDD cell 211 according to the HARQ timing defined in TDD UL-DL configuration #4.

That is, when a UE has a capability of transmitting an uplink control channel through a plurality of uplink carriers and transmits the uplink control channel through the plurality of uplink carriers, a HARQ-ACK for a PDSCH scheduled in each cell is transmitted in an uplink sub-frame of each cell according to HARQ timing defined in the cell in which the PDSCH is scheduled.

Although the above description with reference to FIGS. 2A and 2B is based on cells using different duplex schemes, the HARQ timing method described in the present disclosure can be applied regardless of what duplex scheme each cell has.

Next, HARQ timing described in the present disclosure, when a UE has a capability of transmitting an uplink control channel through a plurality of uplink carriers or a capability of transmitting an uplink control channel through one uplink carrier and transmits the uplink control channel through only one uplink carrier, will be described.

When a UE transmits an uplink control channel through one uplink carrier, a HARQ-ACK for PDSCHs scheduled in a downlink sub-frame of each cell is transmitted in the Pcell, and HARQ timing for the transmission may be differently proposed according to which duplex scheme the Pcell has.

Hereinafter, HARQ timing described in the present disclosure, when a UE has a capability of transmitting an uplink control channel through a plurality of uplink carriers or a capability of transmitting an uplink control channel through one uplink carrier and transmits the uplink control channel through only one uplink carrier, will be described in more detail with reference to FIGS. 3 and 4.

Figure 3:
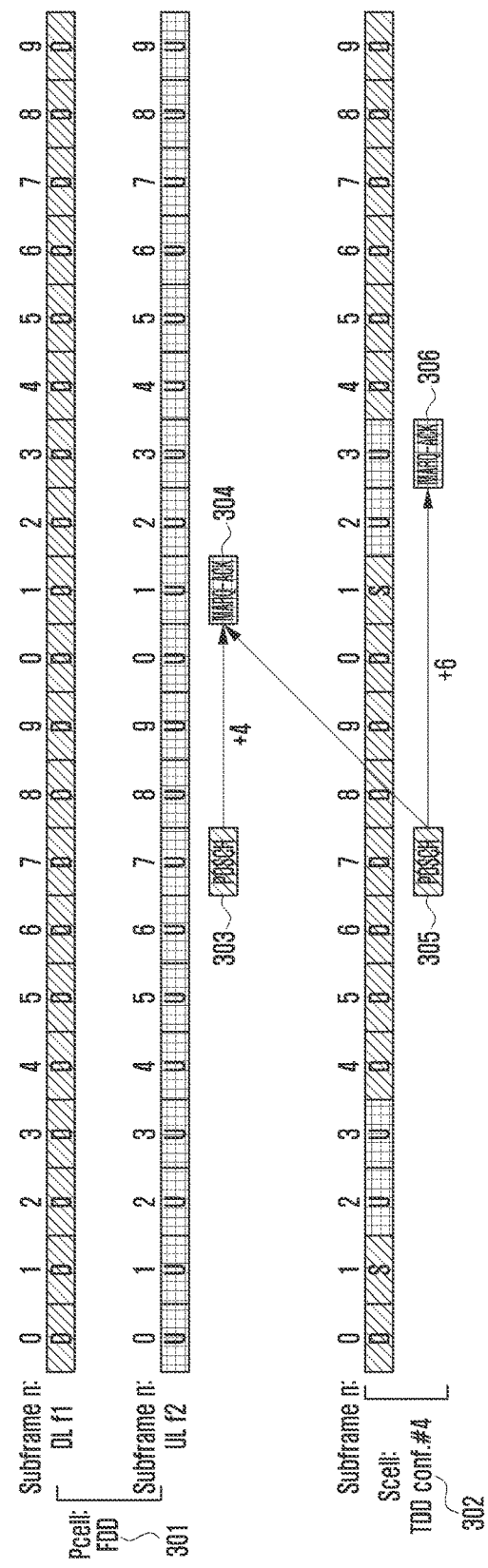
FIG. 3 illustrates an uplink control channel transmission time point according to an embodiment of the present disclosure.
Figure 4A:
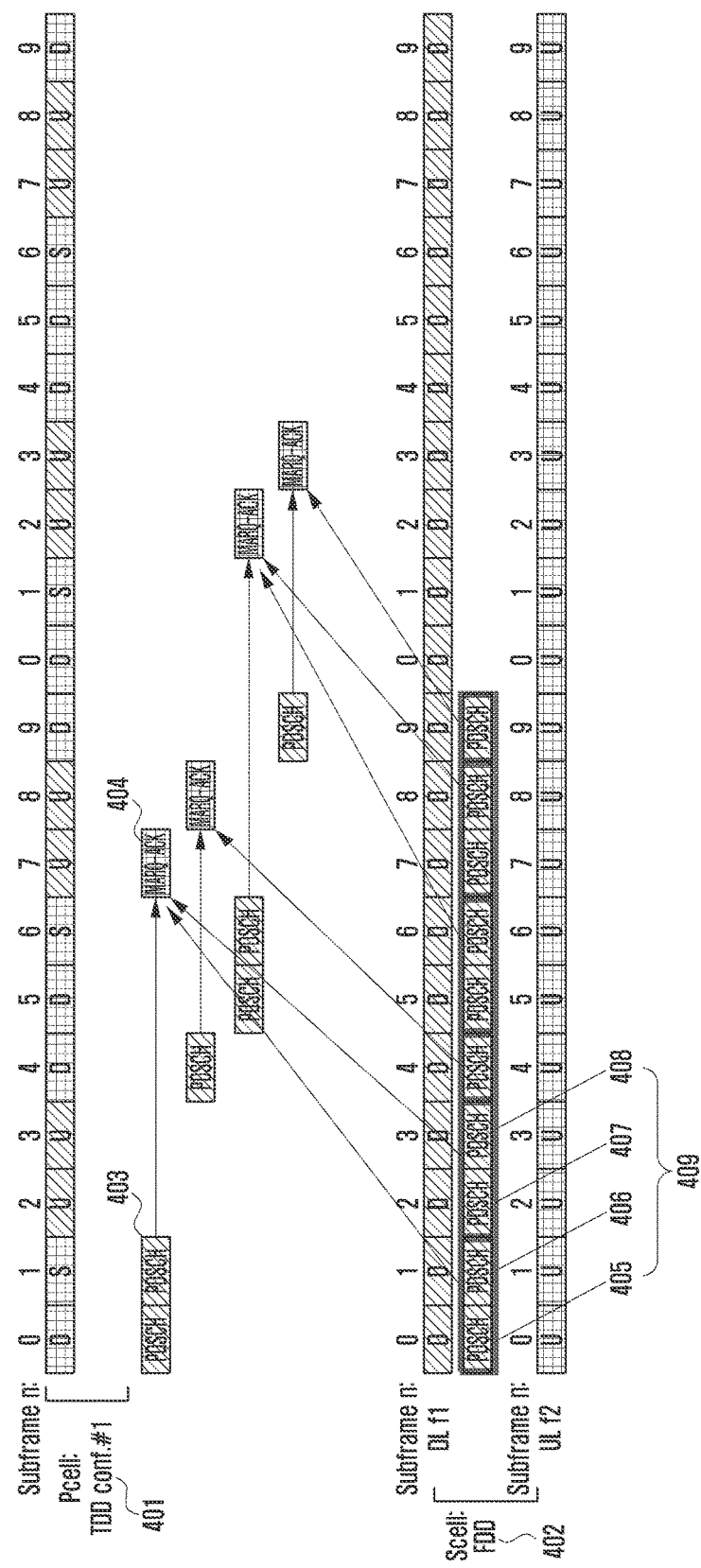
FIG. 4A illustrates an uplink control channel transmission time point according to an embodiment of the present disclosure.
Figure 4B:
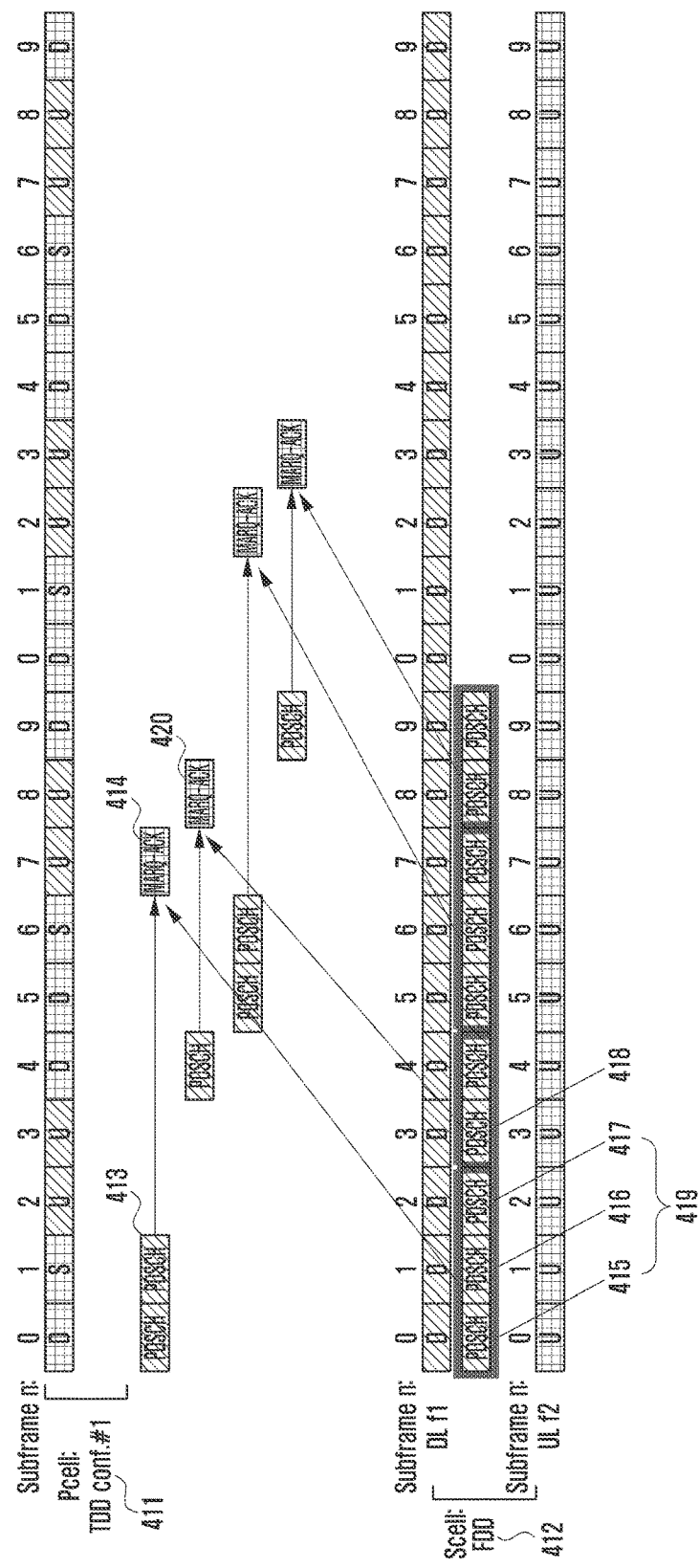
FIG. 4B illustrates an uplink control channel transmission time point according to an embodiment of the present disclosure.
Figure 4C:
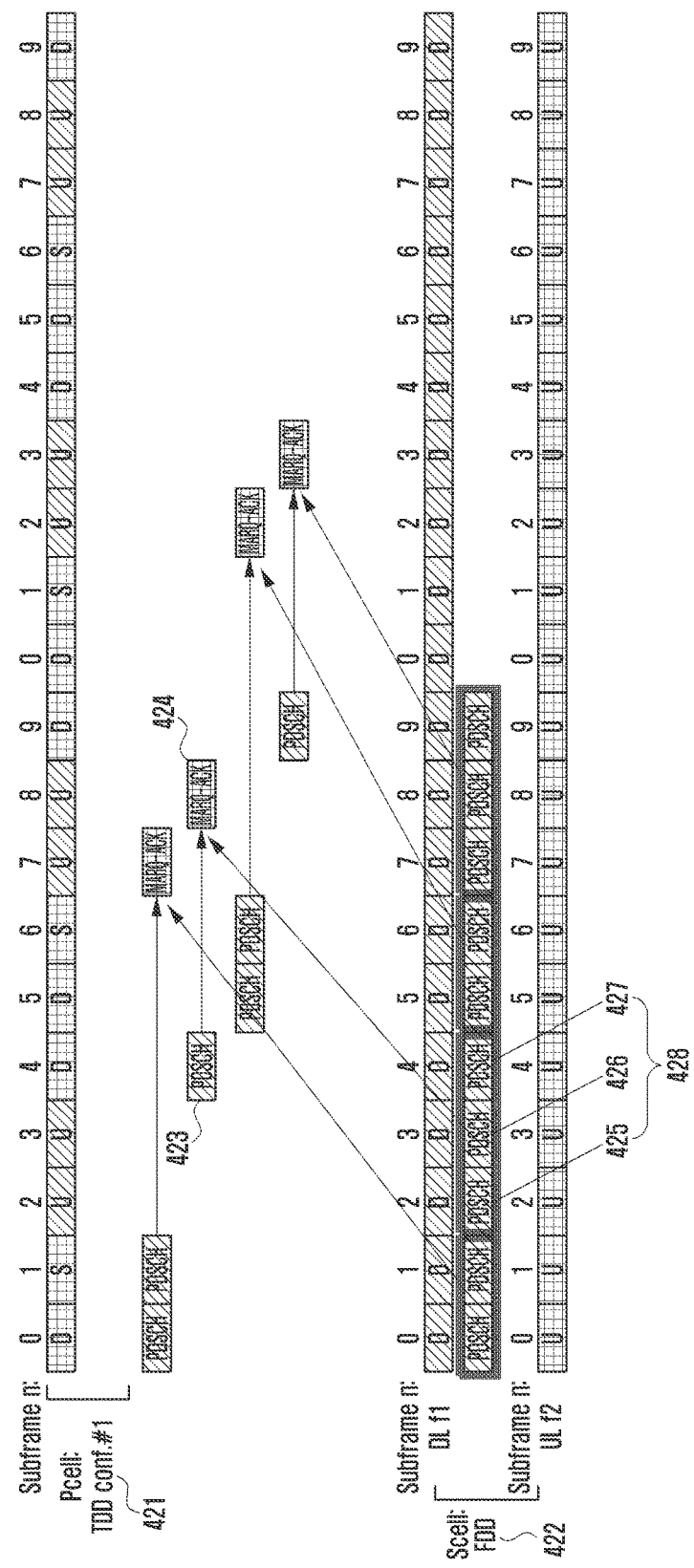
FIG. 4C illustrates an uplink control channel transmission time point according to an embodiment of the present disclosure.

FIG. 3 illustrates an uplink control channel transmission time point according to an embodiment of the present disclosure, FIG. 4A illustrates an uplink control channel transmission time point according to an embodiment of the present disclosure, FIG. 4B illustrates an uplink control channel transmission time point according to an embodiment of the present disclosure, and FIG. 4C illustrates an uplink control channel transmission time point according to an embodiment of the present disclosure.

Referring to FIG. 3, a HARQ timing method described in the present disclosure for PDSCHs scheduled in downlink sub-frames of an FDD cell, which is a Pcell, and PDSCHs scheduled in downlink sub-frames of a TDD cell, which is an Scell, will be described.

The embodiment shown in FIG. 3 is based on an assumption that a UE has a capability of transmitting an uplink control channel through one uplink carrier or a plurality of uplink carriers and transmits the uplink control channel through only one uplink carrier. Further, the embodiment shown in FIG. 3 is based on an assumption that a Pcell uses an FDD scheme and an Scell uses a TDD scheme.

As shown in FIG. 3, a wireless communication system has a structure in which a Pcell 301 and an Scell 302, which respectively use different duplex schemes, coexist. In FIG. 3, the Pcell 301, which may be referred to as an FDD cell 301, uses the FDD scheme, frequency $f_1$ is used for the downlink transmission, and frequency $f_2$ is used for the uplink transmission. The Scell 302, which may be referred to as a TDD cell 302, uses the TDD scheme and includes downlink sub-frames and uplink sub-frames configured according to TDD UL-DL configuration #4.

In the embodiment shown in FIG. 3, the UE has a capability of transmitting an uplink control channel through one uplink carrier or through a plurality of uplink carriers and transmits the uplink control channel through only one uplink carrier. In an embodiment of the present disclosure, a UE has a capability of transmitting an uplink control channel through a plurality of uplink carriers according to a signaling based on a channel state, a location of the UE within a cell, such as a center or an edge of the cell, etc. In spite of the capability, the UE may transmit an uplink control channel through only one uplink carrier. When the UE transmits an uplink control channel through only one uplink carrier, an uplink control channel for downlink data transmitted in a downlink sub-frame of each cell is transmitted in a Pcell and is transmitted in a sub-frame corresponding to a transmission time point defined in the Pcell.

Specifically, when a PDSCH 303 is scheduled to the UE in the Pcell 301, i.e. the FDD cell 301, a HARQ-ACK 304 for the PDSCH 303 is transmitted in an uplink sub-frame of the FDD cell 301 according to HARQ timing defined in the FDD cell 301. For example, when the PDSCH 303 is transmitted in downlink sub-frame #7 of the FDD cell 301, the HARQ-ACK 304 for the PDSCH 303 is transmitted in next uplink sub-frame #1 of the FDD cell 301 according to the HARQ timing defined in the FDD cell 301.

In contrast, when a PDSCH 305 is scheduled to the UE in the Scell 302, i.e. the TDD cell 302, a HARQ-ACK for the PDSCH 305 is transmitted in an uplink sub-frame of the FDD cell 301 according to HARQ timing defined in the FDD cell 301. For example, when the PDSCH 305 is transmitted in downlink sub-frame #7 of the TDD cell 302, the HARQ-ACK 304 for the PDSCH 305 is transmitted in next uplink sub-frame #1 of the FDD cell 301, which is located four sub-frames thereafter, according to the HARQ timing defined in the FDD cell 301. In principle, when the PDSCH 305 is scheduled in downlink sub-frame #7 of the TDD cell 302, a HARQ-ACK 306 for the PDSCH 305 is configured to be transmitted in uplink sub-frame #3 of the TDD cell 302 according to TDD UL-DL configuration #4. However, when an FDD cell is a Pcell and a TDD cell is an Scell, the UE has a capability of transmitting an uplink control channel through a plurality of uplink carriers or a capability of transmitting an uplink control channel through one uplink carrier, and the UE transmits an uplink control channel through only one uplink carrier, a HARQ-ACK for a PDSCH scheduled in each cell is transmitted in an uplink sub-frame of the FDD cell, which is the Pcell, according to the HARQ timing of the FDD cell. Next, with reference to FIGS. 4A to 4C, an HARQ timing method described in the present disclosure for PDSCHs scheduled in downlink sub-frames of a TDD cell, which is a Pcell, and PDSCHs scheduled in downlink sub-frames of an FDD cell, which is an Scell, will be described.

First, an embodiment of control channel transmission through one uplink carrier described in the present disclosure will be described with reference to FIG. 4A.

The embodiment of FIG. 4A is based on an assumption that a UE has a capability of transmitting an uplink control channel through one uplink carrier or through a plurality of uplink carriers and transmits the uplink control channel through only one uplink carrier. Further, the embodiment of FIG. 4A is based on an assumption that the Pcell uses the TDD scheme and the Scell uses the FDD scheme.

Referring to FIG. 4A, a wireless communication system has a structure in which a Pcell 401 and an Scell 402, which respectively use different duplex schemes, coexist. In FIG. 4A, the Pcell 401, which may be referred to as a TDD cell

401, uses the TDD scheme and includes downlink sub-frames and uplink sub-frames configured according to TDD UL-DL configuration #1. The Scell 402, which may be referred to as an FDD cell 402, uses the FDD scheme, frequency $f_1$ is used for the downlink transmission, and frequency $f_2$ is used for the uplink transmission.

In the embodiment shown in FIG. 4A, the UE has a capability of transmitting an uplink control channel through one uplink carrier or through a plurality of uplink carriers and transmits the uplink control channel through only one uplink carrier. When the UE transmits an uplink control channel through only one uplink carrier, an uplink control channel for downlink data transmitted in a downlink sub-frame of each cell is transmitted in a Pcell and is transmitted in a sub-frame corresponding to a transmission time point defined in the Pcell.

Specifically, when PDSCHs 403 are scheduled to the UE in the Pcell 401, i.e. the TDD cell 401, a HARQ-ACK 404 for the PDSCHs 403 is transmitted in an uplink sub-frame of the TDD cell 401 according to HARQ timing defined in UL-DL configuration #1 of the TDD cell 401. For example, when the PDSCHs 403 are transmitted in downlink sub-frame #0 or #1 of the TDD cell 401, the HARQ-ACK 404 for the PDSCHs 403 is transmitted in uplink sub-frame #7 of the TDD cell 401 according to the HARQ timing defined in TDD UL-DL configuration #1. The HARQ timing defined in TDD UL-DL configuration #1 for PDSCHs transmitted in respective downlink sub-frames of the TDD cell is shown in FIG. 4A.

In contrast, when PDSCHs 409, which includes PDSCHs 405 to 408, are scheduled to the UE in the Scell 402, i.e. the FDD cell 402, a HARQ-ACK for the PDSCHs 409 is transmitted in an uplink sub-frame of the TDD cell 401 according to the HARQ timing as follows. When PDSCHs for the TDD cell 401 and the FDD cell are transmitted at the same time point, a HARQ-ACK for the FDD cell is transmitted 402 at the time point defined by the TDD cell 401. That is, when the PDSCHs 409 are transmitted in downlink sub-frames of the FDD cell 402 at the same positions as those of the downlink sub-frames of the TDD cell 401, those being PDSCHs 405 and 406, the HARQ-ACK 404 for the PDSCHs 405 and 406 is transmitted in an uplink sub-frame of the TDD cell 401 according to the HARQ timing defined in UL-DL configuration of the TDD cell 401.

When PDSCHs for a TDD cell and an FDD cell are not transmitted at the same time point, a HARQ-ACK for the FDD cell is transmitted in a previous sub-frame nearest to the PDSCH transmission time point of the FDD cell among the downlink sub-frames of the TDD cell. That is, when the PDSCHs 409 are transmitted in downlink sub-frames of the FDD cell 402 at the same positions as those of uplink sub-frames of the TDD cell 401, those being PDSCHs 407 and 408, a HARQ-ACK for the PDSCHs 407 and 408 is transmitted at HARQ timing defined in a nearest downlink sub-frame among downlink sub-frames of the TDD cell 401 before the downlink sub-frames in which the PDSCHs 407 and 408 are scheduled.

In the case of operating according to the HARQ timing, a UE may be unable to secure a processing time of four sub-frames after receiving the PDSCH. In this event, as an exception, HARQ-ACKs corresponding to PDSCHs scheduled in downlink sub-frames of an FDD cell are transmitted at HARQ timing defined based on a nearest downlink sub-frame of a TDD cell existing after the downlink sub-frames of the FDD cell.

According to the embodiment of FIG. 4A, it is possible to allow a UE to transmit a HARQ-ACK, which is feedback, for a PDSCH scheduled in an FDD cell as fast as possible, so as to increase the data rate.

According to the embodiment of FIG. 4A, the HARQ-ACK 404 for PDSCHs 405 and 406 transmitted in downlink sub-frame #0 or #1 of the FDD cell 402, which are located at the same position as downlink sub-frame #0 or #1 of the TDD cell 401 in FIG. 4A, is transmitted in uplink sub-frame #7 of the TDD cell 401 according to the HARQ timing of UL-DL configuration #1 defined in downlink sub-frame #0 or #1 of the TDD cell 401.

The HARQ-ACK 404 for PDSCHs 407 and 408 transmitted in downlink sub-frame #2 or #3 of the FDD cell 402, which are located at the same position as uplink sub-frame #2 or #3 of the TDD cell 401, is transmitted in uplink sub-frame #7 of the TDD cell 401 according to the HARQ timing defined in downlink sub-frame #1, which is the nearest downlink sub-frame among sub-frames of the TDD cell 401 before downlink sub-frame #2 or #3.

That is, a HARQ-ACK is transmitted according to the HARQ timing defined to match up with downlink sub-frame #1 of the TDD cell 401, which is the nearest downlink sub-frame of the TDD cell 401 among the downlink sub-frames before downlink sub-frame #2 or #3, in which the PDSCHs 407 and 408 are scheduled. Since the HARQ timing defined to match up with downlink sub-frame #1 of the TDD cell 401 corresponds to uplink sub-frame #7 of the TDD cell 401, the HARQ-ACK for the PDSCHs 407 and 408 is transmitted in uplink sub-frame #7 of the TDD cell 401.

In conclusion, when the PDSCHs 409 are scheduled to the UE in the FDD cell 402, a HARQ-ACK for the PDSCHs scheduled in the FDD cell 402 is transmitted in an uplink sub-frame of the TDD cell 401 according to the embodiment of FIG. 4A.

Next, an embodiment of control channel transmission through one uplink carrier proposed by the present disclosure will be described with reference to FIG. 4B.

The embodiment of FIG. 4B is based on an assumption that a UE has a capability of transmitting an uplink control channel through one uplink carrier or through a plurality of uplink carriers and transmits the uplink control channel through only one uplink carrier. Further, the embodiment of FIG. 4B is based on an assumption that a Pcell uses a TDD scheme and an Scell uses an FDD scheme.

Referring to FIG. 4B, a wireless communication system has a structure in which a Pcell 411 and an Scell 412, which respectively use different duplex schemes, coexist. In FIG. 4B, the Pcell 411, which may be referred to as a TDD cell 411, uses the TDD scheme and includes downlink sub-frames and uplink sub-frames configured according to TDD UL-DL configuration #1. The Scell 412, which may be referred to as an FDD cell 412, uses the FDD scheme, frequency $f_1$ is used for the downlink transmission, and frequency $f_2$ is used for the uplink transmission.

In the embodiment shown in FIG. 4B, the UE has a capability of transmitting an uplink control channel through one uplink carrier or through a plurality of uplink carriers and transmits the uplink control channel through only one uplink carrier. When the UE transmits an uplink control channel through only one uplink carrier, an uplink control channel for downlink data transmitted in a downlink sub-frame of each cell is transmitted in a Pcell and is transmitted in a sub-frame corresponding to a transmission time point defined in the Pcell.

Specifically, when PDSCHs 413 are scheduled to the UE in the Pcell 411, i.e. the TDD cell 411, a HARQ-ACK 414 for the PDSCHs 413 is transmitted in an uplink sub-frame of the TDD cell 411 according to HARQ timing defined in UL-DL configuration #1 of the TDD cell 411. For example, the PDSCHs 413 are transmitted in downlink sub-frame #0 or #1 of the TDD cell 411, the HARQ-ACK 414 for the PDSCHs 413 is transmitted in uplink sub-frame #7 of the TDD cell 411 according to the HARQ timing defined in TDD UL-DL configuration #1. The HARQ timing defined in TDD UL-DL configuration #1 for PDSCHs transmitted in respective downlink sub-frames of the TDD cell 411 is shown in FIG. 4B.

In contrast, when PDSCHs 419 are scheduled to the UE in the Scell 412, i.e. the FDD cell 412, a HARQ-ACK for the PDSCHs 419 is transmitted in an uplink sub-frame of the TDD cell 411 according to the HARQ timing as follows. When PDSCHs for the TDD cell 411 and the FDD cell 412 are transmitted at the same time point, a HARQ-ACK for the FDD cell 412 is transmitted at the time point defined by the TDD cell 411. That is, when the PDSCHs 419 are transmitted in downlink sub-frames of the FDD cell 412 at the same positions as those of the downlink sub-frames of the TDD cell 411, those being PDSCHs 415 and 416, the HARQ-ACK 414 for the PDSCHs 415 and 416 is transmitted in an uplink sub-frame of the TDD cell 411 according to the HARQ timing defined in UL-DL configuration of the TDD cell 411.

When PDSCHs for a TDD cell and an FDD cell are not transmitted at the same time point, a HARQ-ACK for the FDD cell is transmitted in a previous or posterior sub-frame nearest to the PDSCH transmission time point of the FDD cell among the downlink sub-frames of the TDD cell. That is, when the PDSCHs 419 are transmitted in downlink sub-frames of the FDD cell 412 at the same positions as those of uplink sub-frames of the TDD cell 411, that being PDSCH 417, a HARQ-ACK for the PDSCHs is transmitted at HARQ timing defined in a nearest downlink sub-frame among downlink sub-frames of the TDD cell 411 before and after the downlink sub-frames in which the PDSCHs are scheduled. When there are two or more nearest downlink sub-frames, the HARQ-ACK is transmitted at HARQ timing defined based on a downlink sub-frame having a smallest sub-frame index.

In the case operating according to the HARQ timing, a UE may be unable to secure a processing time of four sub-frames after receiving the PDSCH. In this event, as an exception, a HARQ-ACK corresponding to the PDSCHs scheduled in downlink sub-frames of an FDD cell is transmitted at HARQ timing defined based on a nearest downlink sub-frame of a TDD cell existing after the downlink sub-frames of the FDD cell.

According to the embodiment of FIG. 4B, HARQ-ACK feedbacks for PDSCHs scheduled in downlink sub-frames of the FDD cell are distributed over all uplink sub-frames to achieve uniform transmission by the UE, so as to prevent too many HARQ-ACK feedbacks from being transmitted in a particular uplink sub-frame.

According to the embodiment of FIG. 4B, the HARQ-ACK 414 for the PDSCHs 415 and 416 transmitted in downlink sub-frame #0 or #1 of the FDD cell 412, which are located at the same position as downlink sub-frame #0 or #1 of the TDD cell 411 in FIG. 4B, is transmitted in uplink sub-frame #7 of the TDD cell according to the HARQ timing of UL-DL configuration #1 defined in downlink sub-frame #0 or #1 of the TDD cell 411.

A HARQ-ACKs for PDSCHs 417 and 418 transmitted in downlink sub-frame #2 or #3 of the FDD cell 412, which are located at the same position as uplink sub-frame #2 or #3 of the TDD cell 411, is transmitted in uplink sub-frame #7 or #8 of the TDD cell 411 according to the HARQ timing defined in downlink sub-frame #1 or #4, which is the nearest downlink sub-frame among sub-frames of the TDD cell 411 before or after downlink sub-frame #2 or #3.

That is, the HARQ-ACK 414 for the PDSCH 417 is transmitted in uplink sub-frame #7 of the TDD cell 411 according to HARQ timing defined to match up with downlink sub-frame #1 of the TDD cell 411, which is the nearest downlink sub-frame among the downlink sub-frames before or after downlink sub-frame #2 in which the PDSCH 417 is scheduled. Further, a HARQ-ACK 420 for the PDSCH 418 is transmitted in uplink sub-frame #8 of the TDD cell 411 according to HARQ timing defined to match up with downlink sub-frame #4 of the TDD cell 411, which is the nearest downlink sub-frame among the downlink sub-frames before or after downlink sub-frame #3 in which the PDSCH 418 is scheduled.

In conclusion, when the PDSCHs 419 are scheduled to the UE in the FDD cell 412, a HARQ-ACK for the PDSCHs 419 scheduled in the FDD cell is transmitted in an uplink sub-frame of the TDD cell 411 according to the embodiment of FIG. 4B.

Next, the an embodiment of control channel transmission through one uplink carrier proposed by the present disclosure will be described with reference to FIG. 4C.

The embodiment of FIG. 4C is based on an assumption that a UE has a capability of transmitting an uplink control channel through one uplink carrier or through a plurality of uplink carriers and transmits the uplink control channel through only one uplink carrier. Further, the embodiment of FIG. 4C is based on an assumption that the Pcell uses the TDD scheme and the Scell uses the FDD scheme.

Referring to FIG. 4C, a wireless communication system has a structure in which a Pcell 421 and an Scell 422, which respectively use different duplex schemes, coexist. In FIG. 4C, the Pcell 421, which may be referred to as a TDD cell 421, uses the TDD scheme and includes downlink sub-frames and uplink sub-frames configured according to TDD UL-DL configuration #4. The Scell 422, which may be referred to as an FDD cell 422, uses the FDD scheme, frequency $f_1$ is used for the downlink transmission, and frequency $f_2$ is used for the uplink transmission.

In the embodiment shown in FIG. 4C, the UE has a capability of transmitting an uplink control channel through one uplink carrier or through a plurality of uplink carriers and transmits the uplink control channel through only one uplink carrier. When the UE transmits an uplink control channel through only one uplink carrier, an uplink control channel for downlink data transmitted in a downlink sub-frame of each cell is transmitted in a Pcell and is transmitted in a sub-frame corresponding to a transmission time point defined in the Pcell.

Specifically, when a PDSCH 423 is scheduled to the UE in the Pcell 421, i.e. the TDD cell 421, a HARQ-ACK 424 for the PDSCH 423 is transmitted in an uplink sub-frame of the TDD cell according to HARQ timing defined in UL-DL configuration #1 of the TDD cell 421. For example, the PDSCH 423 is transmitted in downlink sub-frame #4 of the TDD cell, the HARQ-ACK 424 for the PDSCH 423 is transmitted in uplink sub-frame #8 of the TDD cell 421 according to the HARQ timing defined in TDD UL-DL configuration #1.

In contrast, when PDSCHs 428, which includes PDSCHs 425 to 427, are scheduled to the UE in the FDD cell 422, a HARQ-ACK for the PDSCHs 428 is transmitted in an uplink sub-frame of the TDD cell according to the HARQ timing as follows. When PDSCHs for the TDD cell 421 and the FDD cell 422 are transmitted at the same time point, a HARQ-ACK for the FDD cell 422 is transmitted at the time point defined by the TDD cell 421. That is, when the PDSCHs 428 are transmitted in downlink sub-frames of the FDD cell 422 at the same positions as those of the downlink sub-frames of the TDD cell 421, those being PDSCHs 425 and 426, the HARQ-ACK 424 for the PDSCHs 425 and 426 are transmitted in an uplink sub-frame of the TDD cell 421 according to the HARQ timing defined in UL-DL configuration of the TDD cell 421.

When PDSCHs for a TDD cell and an FDD cell are not transmitted at the same time point, a HARQ-ACK for the FDD cell is transmitted in a posterior sub-frame nearest to the PDSCH transmission time point of the FDD cell among the downlink sub-frames of the TDD cell. That is, when the PDSCHs 428 are transmitted in downlink sub-frames of the FDD cell 422 at the same positions as those of uplink sub-frames of the TDD cell 421, that being the PDSCH 427, a HARQ-ACK for the PDSCH 427 is transmitted at HARQ timing defined in a nearest downlink sub-frame among downlink sub-frames of the TDD cell 421 after the downlink sub-frames in which the PDSCH 427 is scheduled.

According to the embodiment of FIG. 4C, it is possible to secure a processing time of four sub-frames without determination of an additional condition.

According to the embodiment of FIG. 4C, the HARQ-ACK 424 for the PDSCH 427 transmitted in downlink sub-frame #4 1 of the FDD cell 422, which is located at the same position as downlink sub-frame #4 of the TDD cell 421 in FIG. 4C, is transmitted in uplink sub-frame #8 of the TDD cell 421 according to the HARQ timing of UL-DL configuration #1 defined in downlink sub-frame #4 of the TDD cell 421. The HARQ-ACK 424 for PDSCHs 425 and 426 transmitted in downlink sub-frame #2 or #3 of the FDD cell 422, which are located at the same position as uplink sub-frame #2 or #3 of the TDD cell 421, is transmitted in uplink sub-frame #8 of the TDD cell 421 according to the HARQ timing defined to match up with downlink sub-frame #4 of the TDD cell 421, which is the nearest downlink sub-frame among sub-frames of the TDD cell 421 after downlink sub-frame #2 or #3. In conclusion, when the PDSCHs 428 are scheduled to the UE in the FDD cell 422, a HARQ-ACK for the PDSCHs scheduled in the FDD cell 422 is transmitted in an uplink sub-frame of the TDD cell 421 according to the sixth embodiment.

Hereinafter, an uplink control channel transmission process depending on a capability of a UE will be described in more detail in view of an eNB or the UE.

Figure 5A:
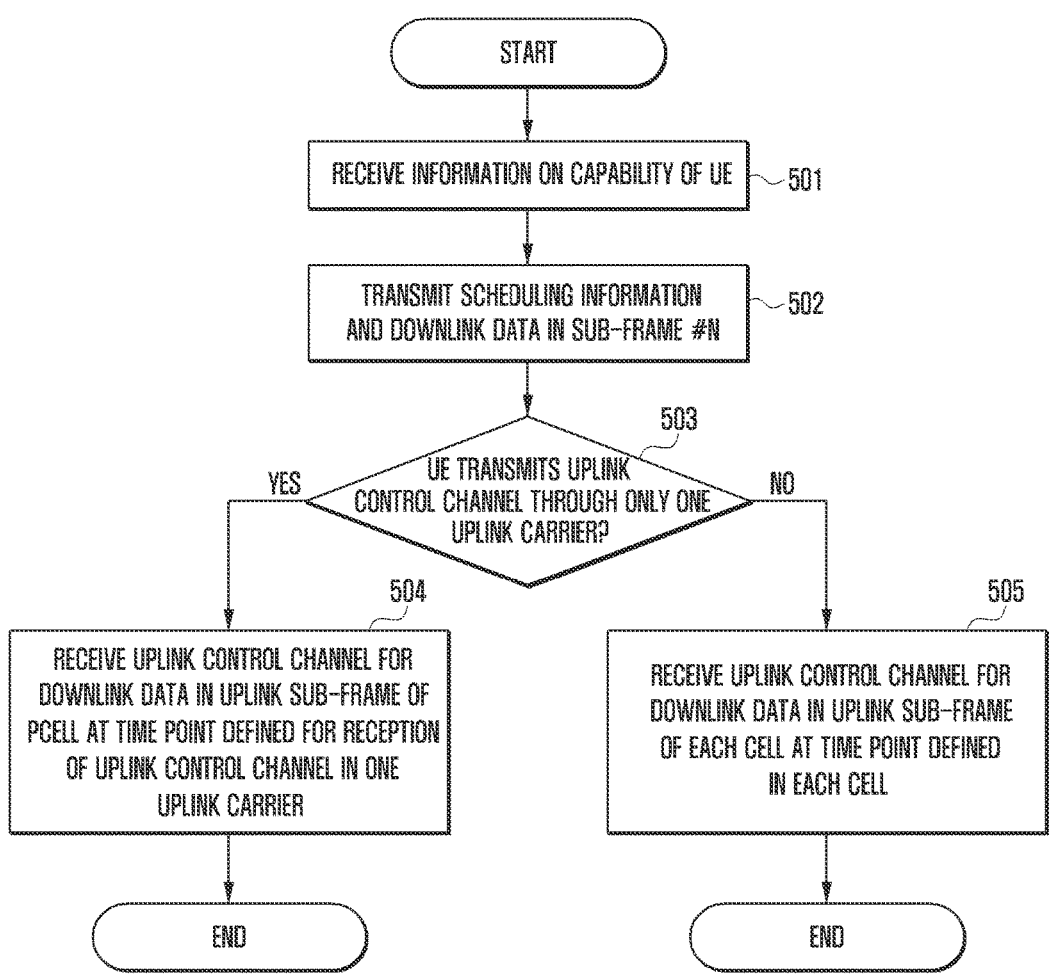
FIG. 5A is a flowchart of a control channel transmission process of an evolved Node B (eNB) according to a capability of a User Equipment (UE) according to an embodiment of the present disclosure.

FIG. 5A is a flowchart of a control channel transmission process of an eNB depending on a capability of a UE according to an embodiment of the present disclosure.

Referring to FIG. 5A, a wireless communication system applies HARQ timing according to whether a UE has a capability of transmitting an uplink control channel through only one uplink carrier or a capability of transmitting an uplink control channel through a plurality of uplink carriers.

In operation 501, an eNB receives information on a capability of a UE from the UE. The information on the capability of the UE may include information on a number of uplink carriers through which the UE transmits an uplink control channel. That is, the information on the capability of the UE may include information on whether the UE has a capability of transmitting an uplink control channel through only one uplink carrier or a capability of transmitting an uplink control channel through a plurality of uplink carriers.

In operation 502, the eNB determines scheduling of downlink data in each cell at sub-frame #n for the UE and transmits scheduling information and downlink data to the UE. Each of the cells may be one of an FDD cell and a TDD cell.

Next, in operation 503, the eNB determines whether the UE transmits an uplink control channel through only one uplink carrier. Specifically, the eNB determines, based on the information on the capability of the UE, whether the UE transmits an uplink control channel through only one uplink carrier or transmits an uplink control channel through a plurality of uplink carriers.

As a result of the determination in operation 503, when the UE transmits an uplink control channel through only one uplink carrier, the eNB proceeds to operation 504.

In operation 504, the eNB receives an uplink control channel for downlink data transmitted in an uplink sub-frame of a Pcell at a time point defined for reception of an uplink control channel on one uplink carrier. That is, the eNB receives a HARQ-ACK for a PDSCH transmitted in sub-frame #n of each cell. In this event, the eNB receives the HARQ-ACK in an uplink sub-frame of a Pcell and at a time point defined by one of the schemes according to the embodiments described above with reference to FIGS. 3 and 4A to 4C.

Specifically, in operation 504, the eNB may receive a HARQ-ACK according to the embodiment of FIG. 3 when the FDD cell is a Pcell and the TDD cell is an Scell and may receive a HARQ-ACK according to one of the embodiments of FIGS. 4A to 4C when the TDD cell is a Pcell and the FDD cell is an Scell.

As a result of the determination in operation 503, when the UE does not transmit an uplink control channel through only one uplink carrier, i.e. when the UE transmits an uplink control channel through a plurality of uplink carriers, the eNB proceeds to operation 505.

In operation 505, the eNB receives an uplink control channel for downlink data transmitted in an uplink sub-frame of each cell at a time point defined in each cell. That is, the eNB receives a HARQ-ACK for a PDSCH, which has been transmitted in sub-frame #n of each cell, in an uplink sub-frame of each cell. In this event, the eNB receives the HARQ-ACK at a time point defined according to one of the embodiments of FIGS. 2A and 2B of the present disclosure.

Specifically, in operation 505, the eNB may receive the HARQ-ACK in each cell according to the embodiment of FIG. 2A when the FDD cell is a Pcell and the TDD cell is an Scell and the eNB may receive the HARQ-ACK in each cell according to the embodiment of FIG. 2B when the TDD cell is a Pcell and the FDD cell is an Scell.

Figure 5B:
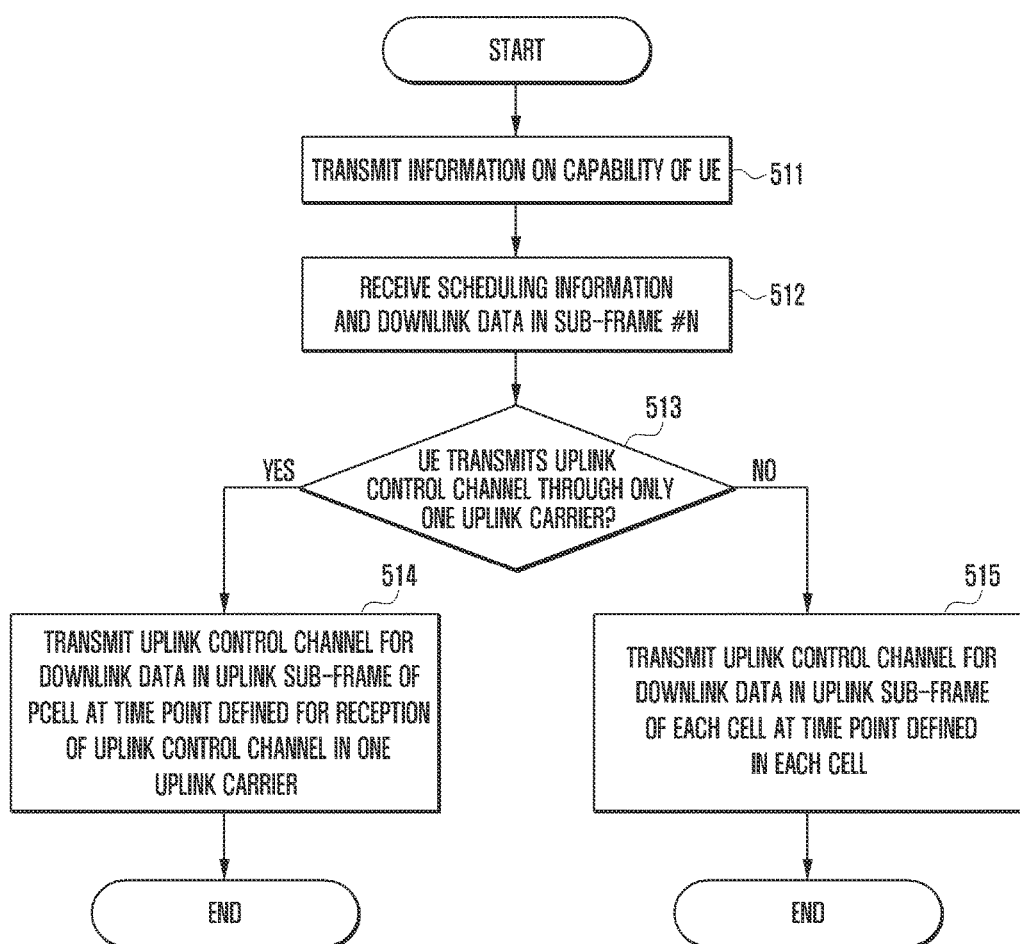
FIG. 5B is a flowchart of a control channel transmission process of a UE depending on a capability of the UE according to an embodiment of the present disclosure.

FIG. 5B is a flowchart of a control channel transmission process of a UE depending on a capability of the UE according to an embodiment of the present disclosure.

Referring to FIG. 5B, a wireless communication system applies HARQ timing based on whether a UE has a capability of transmitting an uplink control channel through only one uplink carrier or a capability of transmitting an uplink control channel through a plurality of uplink carriers.

In operation 511, a UE transmits information on a capability of the UE to an eNB. In this event, the information on the capability of the UE may include information on a number of uplink carriers through which the UE transmits an uplink control channel. That is, the information on the capability of the UE may include information on whether the UE has a capability of transmitting an uplink control channel through only one uplink carrier or a capability of transmitting an uplink control channel through a plurality of uplink carriers.

In operation 512, the UE receives scheduling information and downlink data in sub-frame #n, or in other words, the UE receives scheduling information in each cell and downlink data according to the scheduling information in sub-frame #n from the eNB. Each of the cells may be one of an FDD cell and a TDD cell.

Next, in operation 513, the UE determines whether the UE transmits an uplink control channel through only one uplink carrier. Specifically, the UE determines, based on the information on the capability of the UE, whether the UE transmits an uplink control channel through only one uplink carrier or transmits an uplink control channel through a plurality of uplink carriers.

As a result of the determination in operation 513, when the UE transmits an uplink control channel through only one uplink carrier, the UE proceeds to operation 514.

In operation 514, the UE transmits an uplink control channel for downlink data in an uplink sub-frame of a Pcell at a time point defined for reception of the uplink control channel in one uplink carrier, or, in other words, the UE transmits an uplink control channel for downlink data received in sub-frame #n of each cell. That is, the UE transmits a HARQ-ACK for a PDSCH received in sub-frame #n of each cell. In this event, the UE transmits the HARQ-ACK in a sub-frame of a Pcell and at a time point defined according to one of the embodiments described above with reference to FIGS. 3 and 4A to 4C.

Specifically, in operation 514, the UE may transmit a HARQ-ACK according to the embodiment of FIG. 3 when the FDD cell is a Pcell and the TDD cell is an Scell or may transmit a HARQ-ACK according to one of the embodiments of FIGS. 4A to 4C when the TDD cell is a Pcell and the FDD cell is an Scell.

As a result of the determination in operation 513, when the UE does not transmit an uplink control channel through only one uplink carrier, i.e. when the UE transmits an uplink control channel through a plurality of uplink carriers, the UE proceeds to operation 515.

In operation 515, the UE transmits an uplink control channel for downlink data received in an uplink sub-frame of each cell at a time point defined in each cell. That is, the UE transmits a HARQ-ACK for a PDSCH, which has been received in sub-frame #n of each cell, in an uplink sub-frame of each cell. The UE transmits the HARQ-ACK at a time point defined according to one of the embodiments of FIGS. 2A and 2B of the present disclosure.

Specifically, in operation 515, the UE may transmit the HARQ-ACK in each cell according to the embodiment of FIG. 2A when the FDD cell is a Pcell and the TDD cell is an Scell or may transmit the HARQ-ACK in each cell according to the embodiment of FIG. 2B when the TDD cell is a Pcell and the FDD cell is an Scell.

Figure 6A:
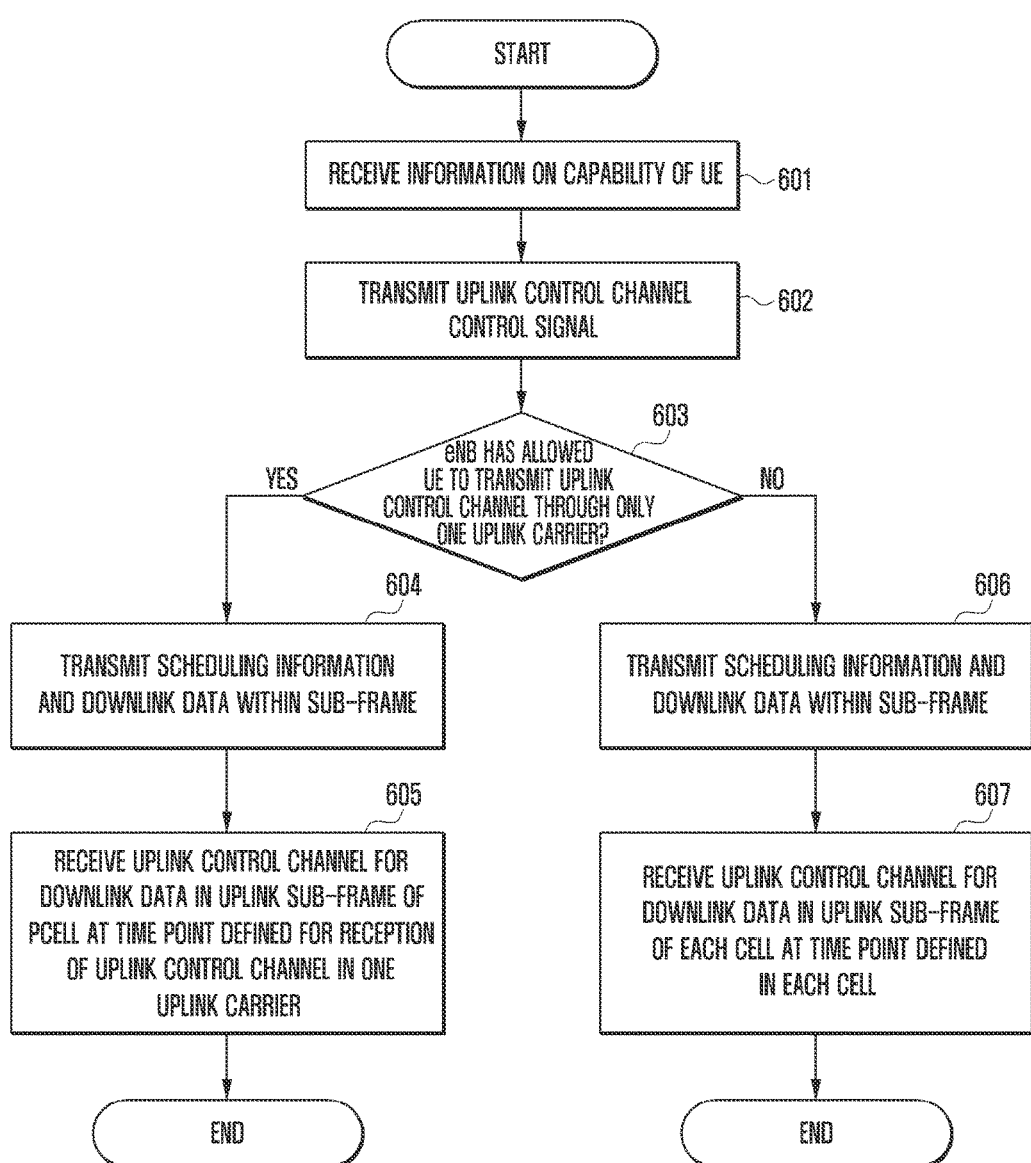
FIG. 6A is a flowchart of a control channel transmission process of an eNB depending on a capability of a UE according to an embodiment of the present disclosure.

FIG. 6A is a flowchart of a control channel transmission process of an eNB depending on a capability of a UE according to an embodiment of the present disclosure.

Referring to FIG. 6A, a wireless communication system applies different HARQ timings according to signaling on the number of uplink carriers for transmission of an uplink control channel. Different HARQ timings are applied by using signaling on the number of uplink carriers for transmission of an uplink control channel for a UE having a capability of transmitting an uplink control channel through a plurality of uplink carriers. Therefore, in the process described below with reference to FIG. 6A, the UE may notify that it has a capability of transmitting an uplink control channel through a plurality of uplink carriers.

In operation 601, an eNB receives information on a capability of a UE from the UE. In this event, the information on the capability of the UE may include information on a number of uplink carriers through which the UE transmits an uplink control channel. That is, the information on the capability of the UE may include information on whether the UE has a capability of transmitting an uplink control channel through only one uplink carrier or a capability of transmitting an uplink control channel through a plurality of uplink carriers.

In operation 602, the eNB transmits an uplink control channel control signal to the UE. The uplink control channel control signal may include information on the number of uplink carriers through which the UE transmits an uplink control channel. The uplink control channel control signal may be used in order to apply different HARQ timings according to the number of uplink carriers for transmission of the uplink control channel. The uplink control channel control signal may be transmitted through a higher layer signal and may be 1 bit information indicating ON-OFF or log (number of uplink carriers for transmission of an uplink control channel)/log (2) bit information.

Next, in operation 603, the eNB determines whether the eNB has allowed, according to the uplink control channel control signal, the UE to transmit an uplink control channel through only one uplink carrier.

As a result of operation 603, when the eNB has allowed the UE to transmit an uplink control channel through only one uplink carrier, the eNB proceeds to operation 604.

In operation 604, the eNB determines scheduling on downlink data in each cell at sub-frame #n for the UE and transmits scheduling information and downlink data within a sub-frame to the UE. Each of the cells may be one of an FDD cell and a TDD cell.

In operation 605, the eNB receives an uplink control channel for downlink data in uplink sub-frame of a Pcell at a time point defined for reception of the uplink control channel in one uplink carrier. That is, the eNB receives a HARQ-ACK for a PDSCH transmitted in sub-frame #n of each cell. The eNB receives the HARQ-ACK in an uplink sub-frame of the Pcell at a time point defined according to one of the embodiments of FIGS. 3 and 4A to 4C of the present disclosure.

Specifically, in operation 605, the eNB may receive a HARQ-ACK according to the embodiment of FIG. 3 when the FDD cell is a Pcell and the TDD cell is an Scell and may receive a HARQ-ACK according to one of the embodiments of FIGS. 4A to 4C when the TDD cell is a Pcell and the FDD cell is an Scell.

As a result of the determination in operation 603, when the UE is not allowed by the uplink control channel control signal to transmit an uplink control channel through only one uplink carrier, i.e. when the UE is allowed to transmit an uplink control channel through a plurality of uplink carriers, the eNB determines scheduling for downlink data in each cell in sub-frame #n for the UE and transmits scheduling information and the downlink data within the sub-frame to the UE in operation 606. Each of the cells may be one of an FDD cell and a TDD cell.

In operation 607, the eNB receives an uplink control channel for downlink data in an uplink sub-frame of each cell at a time point defined in each cell. That is, the eNB receives a HARQ-ACK for a PDSCH, which has been transmitted in sub-frame #n of each cell, in an uplink sub-frame of each cell. The eNB receives the HARQ-ACK at a time point defined according to one of the embodiment of FIGS. 2A and 2B of the present disclosure.

Specifically, in operation 607, the eNB may receive the HARQ-ACK in each cell according to the embodiment of FIG. 2A when the FDD cell is a Pcell and the TDD cell is an Scell and may receive the HARQ-ACK in each cell according to the embodiment of FIG. 2B when the TDD cell is a Pcell and the FDD cell is an Scell.

Figure 6B:
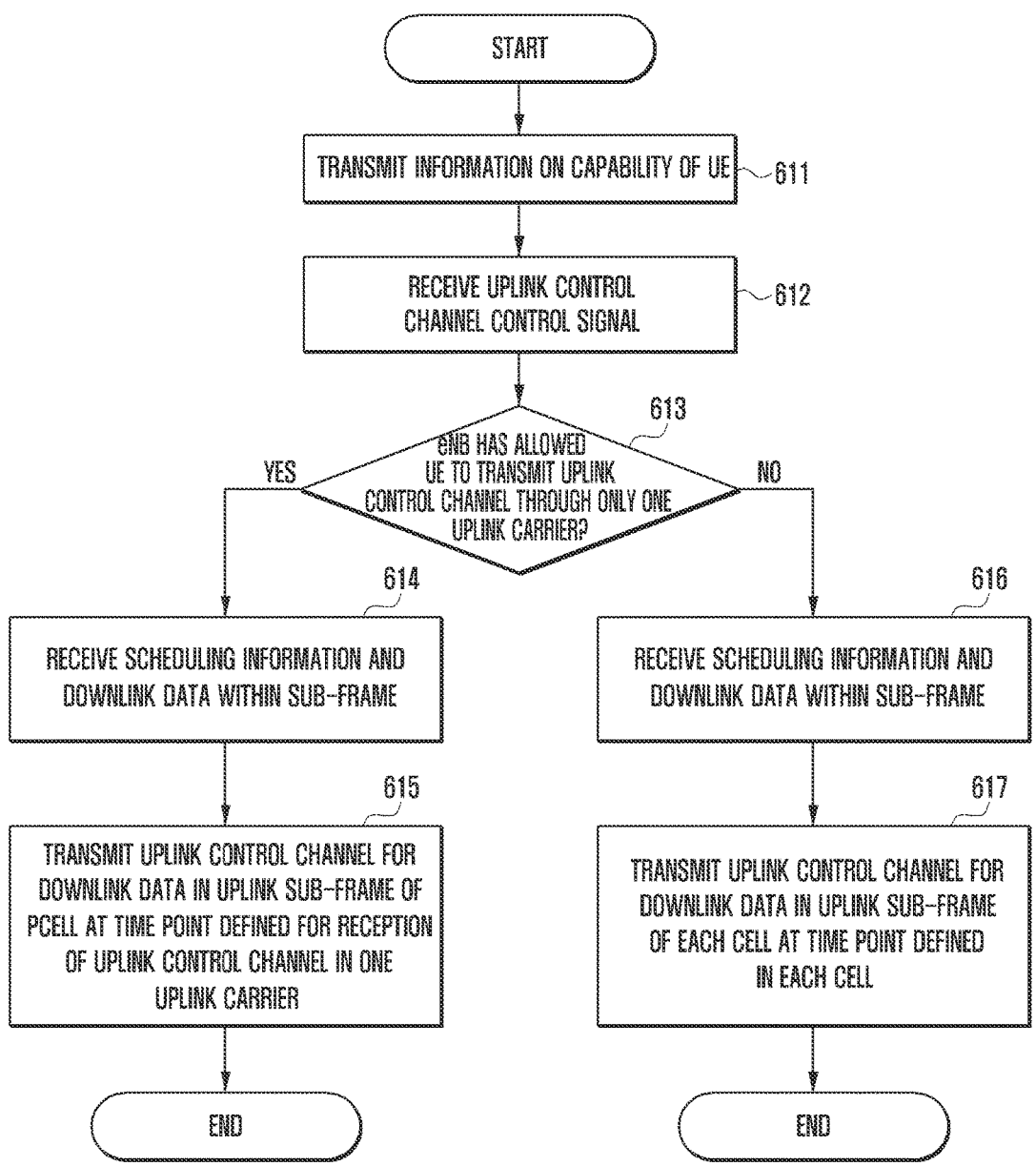
FIG. 6B is a flowchart of a control channel transmission process of a UE according to a capability of the UE according to an embodiment of the present disclosure.

FIG. 6B is a flowchart of a control channel transmission process of a UE depending on a capability of the UE according to an embodiment of the present disclosure.

Referring to FIG. 6B, a wireless communication system applies different HARQ timings according to signaling on a number of uplink carriers for transmission of an uplink control channel. Different HARQ timings are applied by using signaling on the number of uplink carriers for transmission of an uplink control channel for a UE having a capability of transmitting an uplink control channel through a plurality of uplink carriers. Therefore, in the process described below with reference to FIG. 6B, the UE may notify that it has a capability of transmitting an uplink control channel through a plurality of uplink carriers.

In operation 611, a UE transmits information on a capability of the UE to an eNB. The information on the capability of the UE may include information on the number of uplink carriers through which the UE transmits an uplink control channel. That is, the information on the capability of the UE may include information on whether the UE has a capability of transmitting an uplink control channel through only one uplink carrier or a capability of transmitting an uplink control channel through a plurality of uplink carriers.

In operation 612, the UE receives an uplink control channel control signal from the eNB. The uplink control channel control signal may include information on the number of uplink carriers through which the UE transmits an uplink control channel. The uplink control channel control signal may be used in order to apply different HARQ timings according to the number of uplink carriers for transmission of the uplink control channel. The uplink control channel control signal may be transmitted through a higher layer signal and may be 1 bit information indicating ON-OFF or log (number of uplink carriers for transmission of an uplink control channel)/log (2) bit information.

Next, in operation 613, the UE determines whether the eNB has allowed, according to the uplink control channel control signal, the UE to transmit an uplink control channel through only one uplink carrier.

As a result of operation 613, when the eNB has allowed the UE to transmit an uplink control channel through only one uplink carrier, the UE proceeds to operation 614.

In operation 614, the UE receives scheduling and downlink data within a sub-frame, or in other words, the UE receives scheduling for downlink data in each cell and downlink data in sub-frame #n from the eNB. Each of the cells may be one of an FDD cell and a TDD cell.

In operation 615, the UE transmits an uplink control channel for downlink data in uplink sub-frame of a Pcell at a time point defined for reception of the uplink control channel in one uplink carrier. That is, the UE transmits a HARQ-ACK for a PDSCH received in sub-frame #n of each cell. The UE transmits the HARQ-ACK in an uplink sub-frame of the corresponding Pcell at a time point defined according to one of the embodiments of FIGS. 3 and 4A through 4C of the present disclosure.

Specifically, in operation 615, the UE may transmit a HARQ-ACK according to the embodiment of FIG. 3 when the FDD cell is a Pcell and the TDD cell is an Scell or may transmit a HARQ-ACK according to one of the embodiments of FIGS. 4A to 4C when the TDD cell is a Pcell and the FDD cell is an Scell.

As a result of the determination in operation 613, when the UE is not allowed to transmit an uplink control channel through only one uplink carrier, i.e. when the UE is allowed to transmit an uplink control channel through a plurality of uplink carriers, the UE receives scheduling and downlink data within a sub-frame, or in other words, the UE receives scheduling for downlink data in each cell and the downlink data in sub-frame #n in operation 616. Each of the cells may be one of an FDD cell and a TDD cell.

In operation 617, the UE transmits an uplink control channel for downlink data received in an uplink sub-frame of each cell at a time point defined in each cell. That is, the UE transmits a HARQ-ACK for a PDSCH, which has been received in sub-frame #n of each cell, in an uplink sub-frame of each cell. The UE transmits the HARQ-ACK at a time point defined according to one of the embodiments of FIGS. 2A and 2B of the present disclosure.

Specifically, in operation 617, the UE may transmit the HARQ-ACK in each cell according to the embodiment of FIG. 2A when the FDD cell is a Pcell and the TDD cell is an Scell or may transmit the HARQ-ACK in each cell according to the embodiment of FIG. 2B when the TDD cell is a Pcell and the FDD cell is an Scell.

Figure 7:
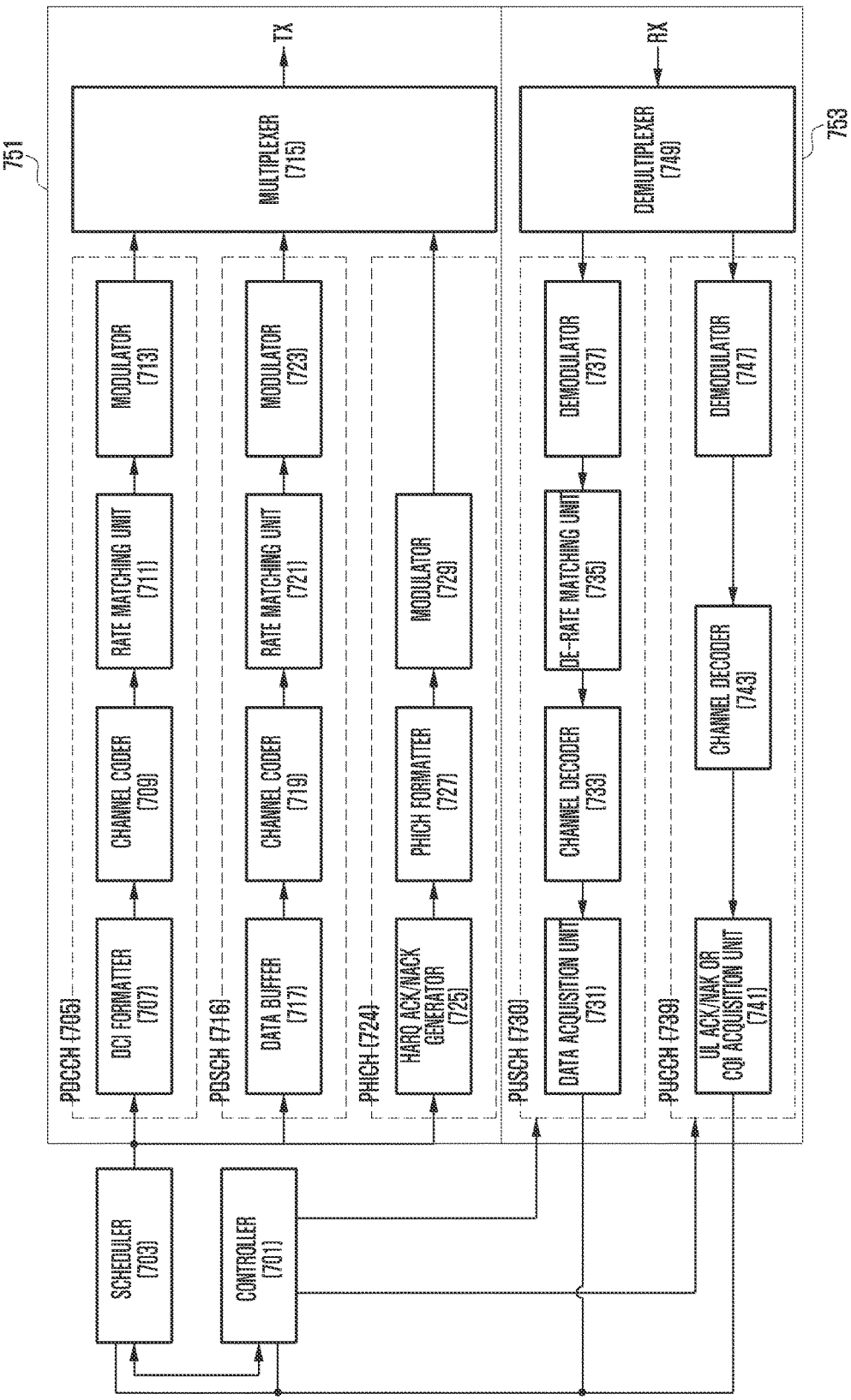
FIG. 7 is a block diagram of an eNB according to an embodiment of the present disclosure.

FIG. 7 is a block diagram of an eNB according to an embodiment of the present disclosure.

Referring to FIG. 7, the eNB apparatus includes a transmission unit 751, a reception unit 753, a controller 701, and a scheduler 703.

The transmission unit 751 and the reception unit 753 may be separate units or may be one unit that is referred to as a transceiver unit and may be collectively referred to as a communication unit. The transmission unit 751 includes a PDCCH block 705, a PDSCH block 716, a Physical Hybrid-ARQ Indicator Channel (PHICH) block 724, and a multiplexer 715. The reception unit 753 includes a PUSCH block 730, a PUCCH block 739, and a demultiplexer 749.

The controller 701 controls Downlink (DL)/Uplink (UL) control channel transmission and/or reception timing. Specifically, the controller 701 controls DL/UL HARQ-ACK transmission/reception timing. The DL/UL HARQ-ACK transmission/reception timing includes all of PUCCH transmission timing with respect to PDSCH transmission, PUSCH timing with respect to PDCCH transmission, and UL grant/PHICH timing with respect to PUSCH transmission. For transmission and/or reception in a plurality of cells, there may be a plurality of transmission units and a plurality of reception units, excluding the PUCCH block 739. However, for convenience of description, it is assumed that only one transmission unit and only one reception unit exist.

The PDCCH block 705 includes a Downlink Control Information (DCI) formatter 707, a channel coder 709, a rate matching unit 711, and a modulator 713. The PDSCH block 716 includes a data buffer 717, a channel coder 719, a rate matching unit 721, and a modulator 723. The PHICH block 724 includes a HARQ ACK/NACK generator 725, a PHICH formatter 727, and a modulator 729. The PUSCH block 730 includes a demodulator 737, a de-rate matching unit 735, a channel decoder 733, and a data acquisition unit 731. The PUCCH block includes a demodulator 747, a channel decoder 743, and an UL ACK/NAK or Channel Quality Information (CQI) acquisition unit 741.

The controller 701, which controls DL/UL HARQ-ACK transmission and/or reception timing, determines to a quantity of data to be transferred to a UE, a quantity of available resources within the system, etc., in order to adjust the timing relationship between physical channels for a UE to be scheduled and then notifies of the timing relationship to the scheduler 703, the PDCCH block 705, the PDSCH block 716, the PHICH block 724, the PUSCH block 730, and the PUCCH block 739. According to an embodiment described above with reference to FIGS. 2A to 6B, the controller 701 transmits uplink control channel control information according to a capability of a UE and determines the DL/UL HARQ-ACK transmission and/or reception timing relationship.

According to the control of the scheduler 703, the DCI formatter 707 configures a DCI. The channel coder 709 provides an error correction capability to the DCI. The rate matching unit 711 rate-matches the DCI provided with the error correction capability in accordance with the quantity of resources to be mapped. The modulator 713 modulates the rate-matched DCI. The multiplexer 715 multiplexes the modulated DCI with other signals.

According to the control of the scheduler 703, data to be transmitted is extracted from the data buffer 717. The channel coder 719 provides an error correction capability to the extracted data. The rate matching unit 721 rate-matches the data provided with the error correction capability in accordance with the quantity of resources to be actually mapped. The modulator 723 modulates the rate-matched data. The multiplexer 715 multiplexes the modulated data with other signals.

According to the control of the scheduler 703, the HARQ ACK/NACK generator 725 generates a HARQ ACK/NACK for a PDSCH received from a UE. The PHICH formatter 727 configures the HARQ ACK/NACK in accordance with the PHICH structure. The modulator 729 modulates the configured HARQ ACK/NACK. The multiplexer 715 multiplexes the modulated HARQ ACK/NACK with other signals.

Further, an OFDM signal is generated from the multiplexed signals and is transmitted to the UE.

The demultiplexer 749 separates a PUSCH signal from signals received from a UE. The demodulator 737 demodulates the PUSCH signal. The de-rate matching unit 735 reconfigures symbols before rate matching from the demodulated PUSCH signal. The channel decoder 733 decodes the reconfigured symbols. The data acquisition unit 731 acquires PUSCH data from the decoded symbols. The data acquisition unit 731 may notify the scheduler 703 of whether a result of the decoding includes an error, in order to adjust the downlink HARQ ACK/NACK generation. The information on whether the result of the decoding includes an error is transferred to the controller 701 that controls the DL/UL HARQ-ACK transmission and/or reception timing, so that the controller 701 adjusts the downlink HARQ ACK/NACK transmission timing.

The demultiplexer 749 separates a PUCCH signal from signals received from a UE based on DL/UL HARQ-ACK transmission and/or reception timing according to an embodiment of the present disclosure. The demodulator 747 demodulates the separated PUCCH signal. The channel decoder 743 decodes the demodulated PUCCH signal. The uplink ACK/NAK or CQI acquisition unit 741 acquires an uplink ACK/NAK or CQI from the decoded PUCCH signal. The acquired uplink ACK/NAK or CQI is provided to the scheduler 703 to be used in determining a Modulation and Coding Scheme (MCS) and whether to retransmit the PDSCH. Further, the acquired uplink ACK/NACK is provided to the controller 701 to adjust the transmission timing of the PDSCH.

Figure 8:
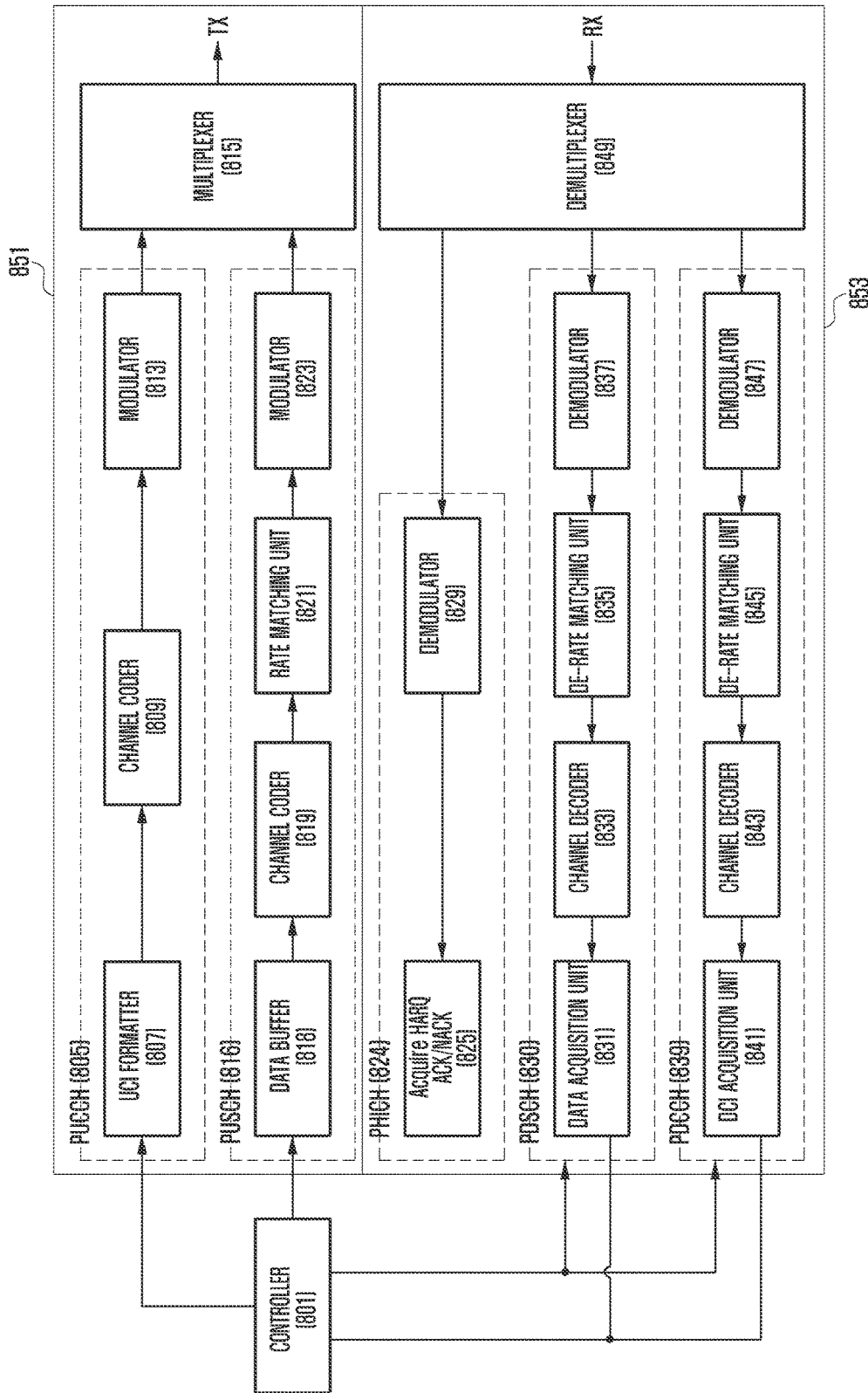
FIG. 8 is a block diagram of a UE according to an embodiment of the present disclosure.

FIG. 8 is a block diagram of a UE according to an embodiment of the present disclosure.

Referring to FIG. 8, the UE includes a transmission unit 851, a reception unit 853, and a controller 801.

The transmission unit 851 and the reception unit 853 may be separate units or may be one unit that is referred to as a transceiver unit and may be collectively referred to as a communication unit. The transmission unit 851 includes a PUCCH block 805, a PUSCH block 816, and a multiplexer 815. The reception unit includes a PHICH block 824, a PDSCH block 830, a PDCCH block 839, and a demultiplexer 849.

The controller 801 controls DL/UL HARQ-ACK transmission and/or reception timing. The PUCCH block 805 includes an Uplink Control Information (UCI) formatter 807, a channel coder 809, and a modulator 813. The PUSCH block 816 includes a data buffer 818, a channel coder 819, a rate matching unit 821, and a modulator 823. The PHICH block 824 includes a HARQ ACK/NACK acquisition unit 825 and a demodulator 829. The PDSCH block 830 includes a demodulator 837, a de-rate matching unit 835, a channel decoder 833, and a data acquisition unit 831. The PDCCH block 839 includes a demodulator 847, a de-rate matching unit 845, a channel decoder 843, and a DCI acquisition unit 841. For transmission and/or reception in a plurality of cells, there may be a plurality of transmission units and a plurality of reception units, excluding the PUCCH block 805. However, for convenience of description, it is assumed that only one transmission unit and only one reception unit exist.

The controller 801, which controls DL/UL HARQ-ACK transmission and/or reception timing, obtains information on which cell a PDSCH is to be received from and which cell a PDSCH is to be transmitted to, at the time of self-scheduling or cross carrier scheduling, from a DCI received from an eNB, selects a cell for DL/UL HARQ-ACK transmission, adjusts the transmission and/or reception timing relationship between physical channels, and notifies of the obtained information, the selected cell, and the adjusted timing relationship to the PUCCH block 805, the PUSCH block 816, the PHICH block 824, the PDSCH block 830, and the PDCCH block 839. According to an embodiment described above with reference to FIGS. 2A to 6B, the controller 801 determines the DL/UL HARQ-ACK transmission and/or reception timing relationship.

The UCI formatter 807 configures an HARQ ACK/NACK or CQI by using UCI according to the timing control of the controller 801 that controls the DL/UL HARQ-ACK transmission and/or reception timing. The channel coder 809 provides an error correction capability to the HARQ ACK/NACK or CQI. The modulator 813 modulates the HARQ ACK/NACK or CQI provided with the error correction capability. The multiplexer 815 multiplexes the modulated HARQ ACK/NACK or CQI with other signals.

Data to be transmitted is extracted from the data buffer 818. The channel coder 819 provides an error correction capability to the extracted data. The rate matching unit 821 rate-matches the data provided with the error correction capability in accordance with the quantity of resources to be actually mapped. The modulator 823 modulates the rate-matched data. The multiplexer 815 multiplexes the modulated data with other signals.

Further, a Single Carrier-Frequency Division Multiple Access (SC-FDMA) signal is generated from the multiplexed signals and is transmitted to an eNB in consideration of the DL/UL HARQ-ACK transmission and/or reception timing according to an embodiment of the present disclosure.

The demultiplexer 849 separates a PHICH signal from signals received from an eNB according to DL/UL HARQ-ACK transmission and/or reception timing. The demodulator 829 demodulates the separated PHICH signal. The HARQ ACK/NACK acquisition unit 825 acquires a HARQ ACK/NACK for a PUSCH from the demodulated PHICH signal.

The demultiplexer 849 separates a PDSCH signal from signals received from an eNB. The demodulator 837 demodulates the separated PDSCH signal. The de-rate matching unit 835 reconfigures symbols before rate matching from the demodulated PDSCH signal. The channel decoder 833 decodes the reconfigured symbols. The data acquisition unit 831 acquires PDSCH data from the decoded symbols. The data acquisition unit 831 notifies the PUCCH block 805 of information on whether a result of the decoding is erroneous, to adjust uplink HARQ ACK/NACK generation, and provides the information to the controller 801 for controlling the DL/UL HARQ-ACK transmission and/or reception timing, so that the controller 801 adjusts the timing for transmission of the uplink HARQ ACK/NACK.

The demultiplexer 849 separates a PDCCH signal from signals received from an eNB. The demodulator 847 demodulates the separated PDCCH signal. The channel decoder 833 decodes the demodulated PDCCH signal. The DCI acquisition unit 841 acquires DCI from the decoded PDCCH signal.

Although the various embodiments described above are based on an example of HARQ-ACK/NACK, various embodiments of the present disclosure can be applied to other feedback signals similar to the HARQ-ACK/NACK. Further, in the various embodiments described above, a UE transmits a feedback of a PDSCH after receiving the PDSCH. However, various embodiments of the present disclosure can be applied to other similar data or signals also.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting and/or receiving a control channel by a base station in a wireless communication system supporting a carrier aggregation (CA), the method comprising:
   receiving, from a terminal, capability information of the terminal, the capability information comprising first information on whether a transmission of a physical uplink control channel (PUCCH) on at least one secondary cell (SCell) in addition to a primary cell (PCell) is supported by the terminal;
   transmitting, to the terminal, configuration information associated with the PUCCH based on the capability information, the configuration information indicating whether an SCell is configured to carry PUCCH or not;
   transmitting, to the terminal, scheduling information and downlink data corresponding to the scheduling information; and
   receiving, from the terminal, the PUCCH for the downlink data on the PCell or on the PCell and the SCell, based on the configuration information,
   wherein, if the configuration information indicates that the SCell is configured to carry the PUCCH, the PUCCH for the downlink data is received on the PCell and the SCell using HARQ timing for the PCell and the SCell, and
   wherein, if the configuration information indicates that the SCell is not configured to carry the PUCCH, the PUCCH for the downlink data is received on the PCell using HARQ timing for the PCell.

2. The method of claim 1, wherein the PUCCH includes an acknowledgement/negative acknowledgement (ACK/NACK) indicating whether the downlink data has been received.

3. The method of claim 1, wherein, if the configuration information indicates that the SCell is configured to carry the PUCCH, the PUCCH for the downlink data transmitted on a cell associated with the PCell is received on the PCell and the PUCCH for the downlink data transmitted on a cell associated with the SCell is received on the SCell.

4. A method of transmitting and/or receiving a control channel by a terminal in a wireless communication system supporting a carrier aggregation (CA), the method comprising:
   transmitting, to the base station, capability information of the terminal, the capability information comprising first information on whether a transmission of a physical uplink control channel (PUCCH) on at least one secondary cell (SCell) in addition to a primary cell (PCell) is supported by the terminal;
   receiving, from the base station, configuration information associated with the PUCCH based on the capability information, the configuration information indicating whether an SCell is configured to carry PUCCH or not;
   receiving, from the base station, scheduling information of the base station and downlink data corresponding to the scheduling information; and
   transmitting, to the base station, the PUCCH for the downlink data on the PCell or on the PCell and the SCell, based on the configuration information,
   wherein, if the configuration information indicates that the SCell is configured to carry the PUCCH, the PUCCH for the downlink data is transmitted on the PCell and the SCell using HARQ timing for the PCell and the SCell, and
   wherein, if the configuration information indicates that the SCell is not configured to carry the PUCCH, the PUCCH for the downlink data is transmitted on the PCell using HARQ timing for the PCell.

5. The method of claim 4, wherein the PUCCH includes an acknowledgement/negative acknowledgement (ACK/NACK) indicating whether the downlink data has been received.

6. The method of claim 4, wherein, if the configuration information indicates that the SCell is configured to carry the PUCCH, the PUCCH for the downlink data transmitted on a cell associated with the PCell is transmitted on the PCell and the PUCCH for the downlink data transmitted on a cell associated with the SCell is transmitted on the SCell.

7. A base station for transmitting and/or receiving a control channel in a wireless communication system supporting a carrier aggregation (CA), the base station comprising:
   a transceiver unit configured to transmit and receive signals; and
   a controller configured to control the transceiver unit:
      to receive, from the terminal, capability information of the terminal, the capability information comprising first information on whether a transmission of a physical uplink control channel (PUCCH) on at least one secondary cell (SCell) in addition to a primary cell (PCell) is supported by the terminal;

to transmit, to the terminal, configuration information associated with the PUCCH based on the capability information, the configuration information indicating whether an SCell is configured to carry PUCCH or not;

to transmit, to the terminal, scheduling information and downlink data corresponding to the scheduling information; and to receive, from the terminal, the PUCCH for the downlink data on the PCell or on the PCell and the SCell, based on the configuration information, wherein, if the configuration information indicating that the SCell is configured to carry the PUCCH, the PUCCH for the downlink data transmitted on a cell corresponding to the PCell is received on the PCell and the PUCCH for the downlink data transmitted on a cell corresponding to the SCell is received on the SCell.

8. The base station of claim 7, wherein the PUCCH includes an acknowledgement/negative acknowledgement (ACK/NACK) indicating whether the downlink data has been received.

9. The base station of claim 7, wherein, if the configuration information indicates that the SCell is configured to carry the PUCCH, the PUCCH for the downlink data transmitted on a cell associated with the PCell is received on the PCell and the PUCCH for the downlink data transmitted on a cell associated with the SCell is received on the SCell.

10. A terminal for transmitting and/or receiving a control channel in a wireless communication system supporting a carrier aggregation (CA), the terminal comprising:

a transceiver unit configured to transmit and receive signals; and a controller configured to control the transceiver unit:

to transmit, to the base station, capability information of the terminal, the capability information comprising first information on whether a transmission of a physical uplink control channel (PUCCH) on at least one secondary cell (SCell) in addition to a primary cell (PCell) is supported by the terminal;

to receive, from the base station, configuration information associated with the PUCCH based on the capability information, the configuration information indicating whether an SCell is configured to carry PUCCH or not;

to receive, from the base station, scheduling information of the base station and downlink data corresponding to the scheduling information; and to transmit, to the base station, the PUCCH for the downlink data on the PCell or on the PCell and the SCell, based on the configuration information, wherein, if the configuration information indicates that the SCell is configured to carry the PUCCH, the PUCCH for the downlink data is transmitted on the PCell and the Sell using HARQ timing for the PCell and the SCell, and wherein, if the configuration information indicates that the SCell is not configured to carry the PUCCH, the PUCCH for the downlink data is transmitted on the PCell using HARQ timing for the PCell.

11. The terminal of claim 10, wherein the PUCCH includes an acknowledgement/negative acknowledgement (ACK/NACK) indicating whether the downlink data has been received.

12. The terminal of claim 10, wherein the controller is configured to control the transceiver unit to: if the configuration information indicates that the SCell is configured to carry the PUCCH, transmit the PUCCH for the downlink data on a cell associated with the PCell is transmitted on the PCell and transmit the PUCCH for the downlink data transmitted on a cell associated with the SCell on the SCell.

* * * * *